US012142228B2

(12) United States Patent
Yokoyama et al.

(10) Patent No.: US 12,142,228 B2
(45) Date of Patent: Nov. 12, 2024

(54) DISPLAY DEVICE

(71) Applicant: Sony Semiconductor Solutions Corporation, Kanagawa (JP)

(72) Inventors: Kazuki Yokoyama, Kanagawa (JP); Seisan Hoshimoto, Kanagawa (JP); Mayuko Yoshida, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/569,405

(22) PCT Filed: May 6, 2022

(86) PCT No.: PCT/JP2022/019562
§ 371 (c)(1),
(2) Date: Dec. 12, 2023

(87) PCT Pub. No.: WO2023/276445
PCT Pub. Date: Jan. 5, 2023

(65) Prior Publication Data

US 2024/0274091 A1 Aug. 15, 2024

(30) Foreign Application Priority Data

Jul. 1, 2021 (JP) ................................ 2021-110142

(51) Int. Cl.
*G09G 3/3275* (2016.01)

(52) U.S. Cl.
CPC ....... *G09G 3/3275* (2013.01); *G09G 2310/08* (2013.01)

(58) Field of Classification Search
CPC . G09G 3/3275; G09G 2310/08; G09G 3/2092
See application file for complete search history.

(56) References Cited

U.S. PATENT DOCUMENTS

2010/0171725 A1 7/2010 Tsai
2011/0298770 A1 12/2011 Chen
(Continued)

FOREIGN PATENT DOCUMENTS

JP S6437585 A 2/1989
JP H06120091 A 4/1994
(Continued)

OTHER PUBLICATIONS

International Search Report (PCT/ISA/210), International Application No. PCT/JP2022/019562, dated Jul. 19, 2022.

*Primary Examiner* — Abbas I Abdulselam
(74) *Attorney, Agent, or Firm* — Michael Best & Friedrich LLP

(57) ABSTRACT

The pixel array unit (10) is configured by a plurality of pixels including light emitting elements and pixel circuits that cause the light emitting elements to emit light and arranged in a two-dimensional matrix. Data lines (70) are arranged for each of columns in the pixel array unit (10) and transmit image signals of the pixels. A first pixel group (121) is configured by pixels arranged in a plurality of adjacent rows. A second pixel group (122) is configured by pixels arranged in a plurality of adjacent rows and is arranged adjacent to the first pixel group (122). In the pixels of the first pixel group (121), the image signals are transmitted in common for each of the columns via the data lines (70) and, in the pixels (122) of the second pixel group, the image signals are transmitted in common for each of the columns via a data line different from the data line that transmits the image signals to the first pixel group (121).

8 Claims, 22 Drawing Sheets

(56) References Cited

U.S. PATENT DOCUMENTS

| | | | | |
|---|---|---|---|---|
| 2017/0004794 | A1 | 1/2017 | Huang | |
| 2017/0103695 | A1* | 4/2017 | Nishimura | G09G 3/2018 |

FOREIGN PATENT DOCUMENTS

| | | | |
|---|---|---|---|
| JP | H10221713 | A | 8/1998 |
| JP | 2011128442 | A | 6/2011 |
| WO | 2010100938 | A1 | 9/2010 |

* cited by examiner

DISPLAY DEVICE

FIELD

The present disclosure relates to a display device.

BACKGROUND

A display device is used in which pixels including display elements by organic electro luminescence (EL) are arranged in a two-dimensional matrix. This display element by the organic EL is a self-luminous display element and has advantages such as higher image quality and higher response speed than a liquid crystal panel. As such a display device, a display panel has been proposed in which signal lines for transmitting control signals are arranged for every two pixel rows in pixels arranged in a two-dimensional matrix and two pixels arranged in these two rows are driven as one pixel (see, for example, Patent Literature 1.). In this display panel, image signals are individually input to the two pixels, whereby high-gradation display is performed.

CITATION LIST

Patent Literature

Patent Literature 1: JP 2011-128442 A

SUMMARY

Technical Problem

However, in the related art described above, since an image of one row is displayed by the pixels in the two rows, there is a problem in that the configuration of the display device is complicated.

Therefore, the present disclosure proposes a display device with a simplified configuration.

Solution to Problem

A display device according to the present disclosure includes: A display device comprising: a pixel array unit configured by a plurality of pixels including light emitting elements and pixel circuits that cause the light emitting elements to emit light and arranged in a two-dimensional matrix; a plurality of data lines that are arranged for each of columns in the pixel array unit and transmit image signals of the pixels; a first pixel group configured by pixels arranged in a plurality of adjacent rows; and a second pixel group configured by pixels arranged in the plurality of adjacent rows and arranged adjacent to the first pixel group; wherein in the pixels of the first pixel group, the image signals are transmitted in common for each of the columns via the data line, and in the pixels of the second pixel group, the image signals are transmitted in common for each of the columns via the data line different from the data line that transmits the image signals to the first pixel group.

DESCRIPTION OF EMBODIMENTS

Figure 1:
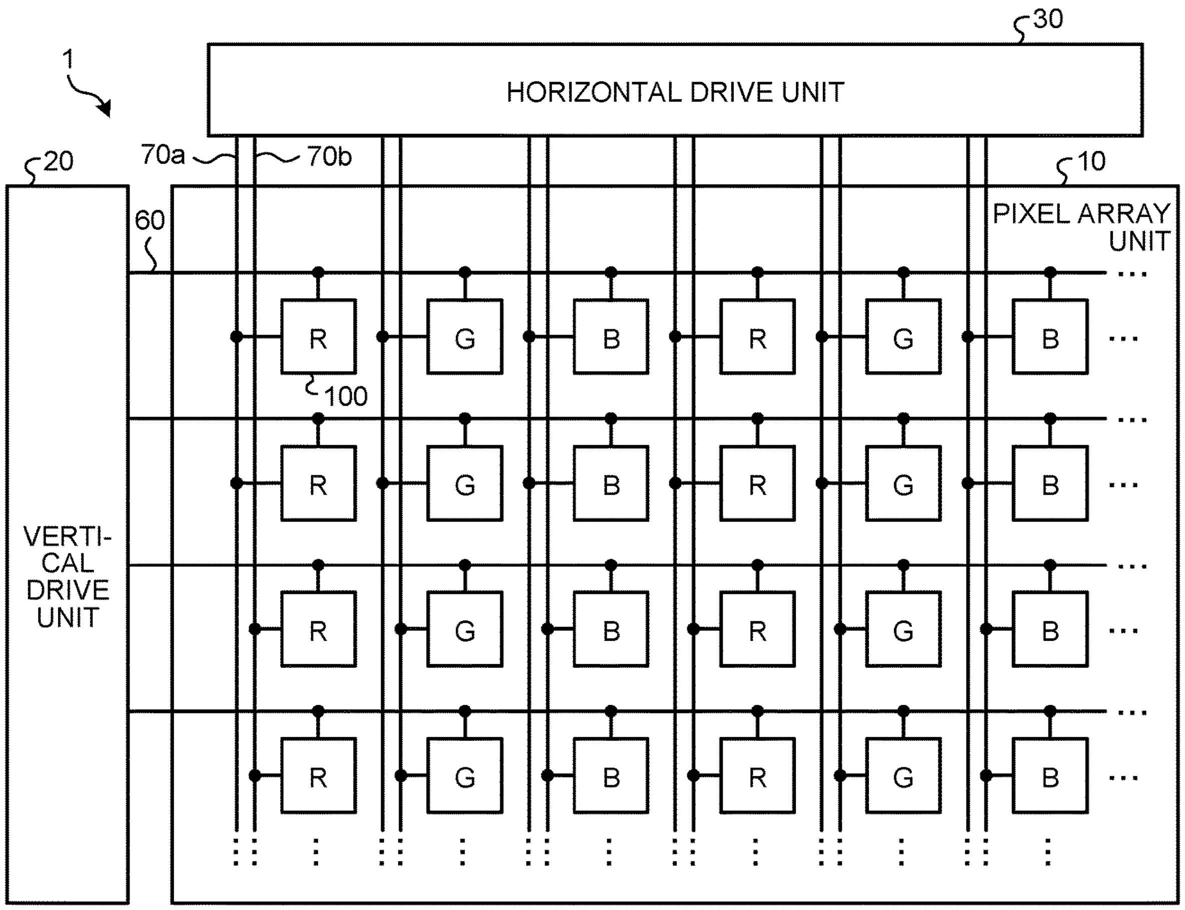
FIG. 1 is a diagram illustrating a configuration example of a display device according to a first embodiment of the present disclosure.

Embodiments of the present disclosure are explained in detail below with reference to the drawings. Explanation is made in the following order. Note that, in the embodiments explained below, redundant explanation is omitted by denoting the same parts with the same reference numerals and signs.

1. First Embodiment
2. Second Embodiment
3. Third Embodiment
4. Fourth Embodiment
5. Modifications
6. Configuration example of a horizontal drive unit

1. First Embodiment

[Configuration of a Display Device]

FIG. 1 is a diagram illustrating a configuration example of a display device according to a first embodiment of the present disclosure. FIG. 1 is a block diagram illustrating a configuration example of a display device 1. The display device 1 is a device that displays an image 25 based on image data input from an external device. The display device 1 includes a pixel array unit 10, a vertical drive unit 20, and a horizontal drive unit 30.

The pixel array unit 10 is configured by arranging a plurality of pixels 100. The pixel array unit 10 in the figure illustrates an example in which a plurality of pixels 100 is arrayed in a shape of a two-dimensional matrix. Here, the pixel 100 includes a light emitting element and a pixel circuit that causes the light emitting element to emit light and emits light at luminance corresponding to an input image signal. For this light emitting element, for example, an organic EL element can be used. The pixels 100 can be configured to irradiate light having wavelengths of red light, green light, and blue light. "R", "G", and "B" of the pixels 100 in the figure represent wavelengths of light emitted by the respective pixels 100.

Row signal lines 60 and data lines 70 (70*a* and 70*b*) are wired to the respective pixels 100. The row signal lines 60 transmit a control signal of the pixel circuit. The data lines 70 transmits an image signal. Note that the row signal lines 60 are arranged for each of rows having a shape of a two-dimensional matrix and are wired in common to the plurality of pixels 100 arranged in one row. The data lines 70 are arranged for each of columns of the shape of the two-dimensional matrix and are wired in common to the plurality of pixels 100 arranged in one column. Note that, in the display device 1 in the figure, the data lines 70 are wired in common to the pixels 100 included in the same pixel group in the plurality of pixels 100 arranged in one column. The data lines 70 and the pixel group are explained below.

The vertical drive unit 20 generates a control signal for the pixels 100 explained above. The vertical drive unit 20 in the figure generates a control signal for each of rows of the two-dimensional matrix of the pixel array unit 10 and sequentially outputs the control signal via the row signal lines 60.

The horizontal drive unit 30 generates an image signal for the pixels 100 and outputs the generated image signal to the pixels 100. The horizontal drive unit 30 in the figure outputs an image signal for each of columns of the pixel array unit 10 via the data lines 70. Note that the image signal is also referred to as video signal or luminance signal. Note that the horizontal drive unit 30 is an example of an image signal generation unit.

[Configuration of a Pixel]

Figure 2:
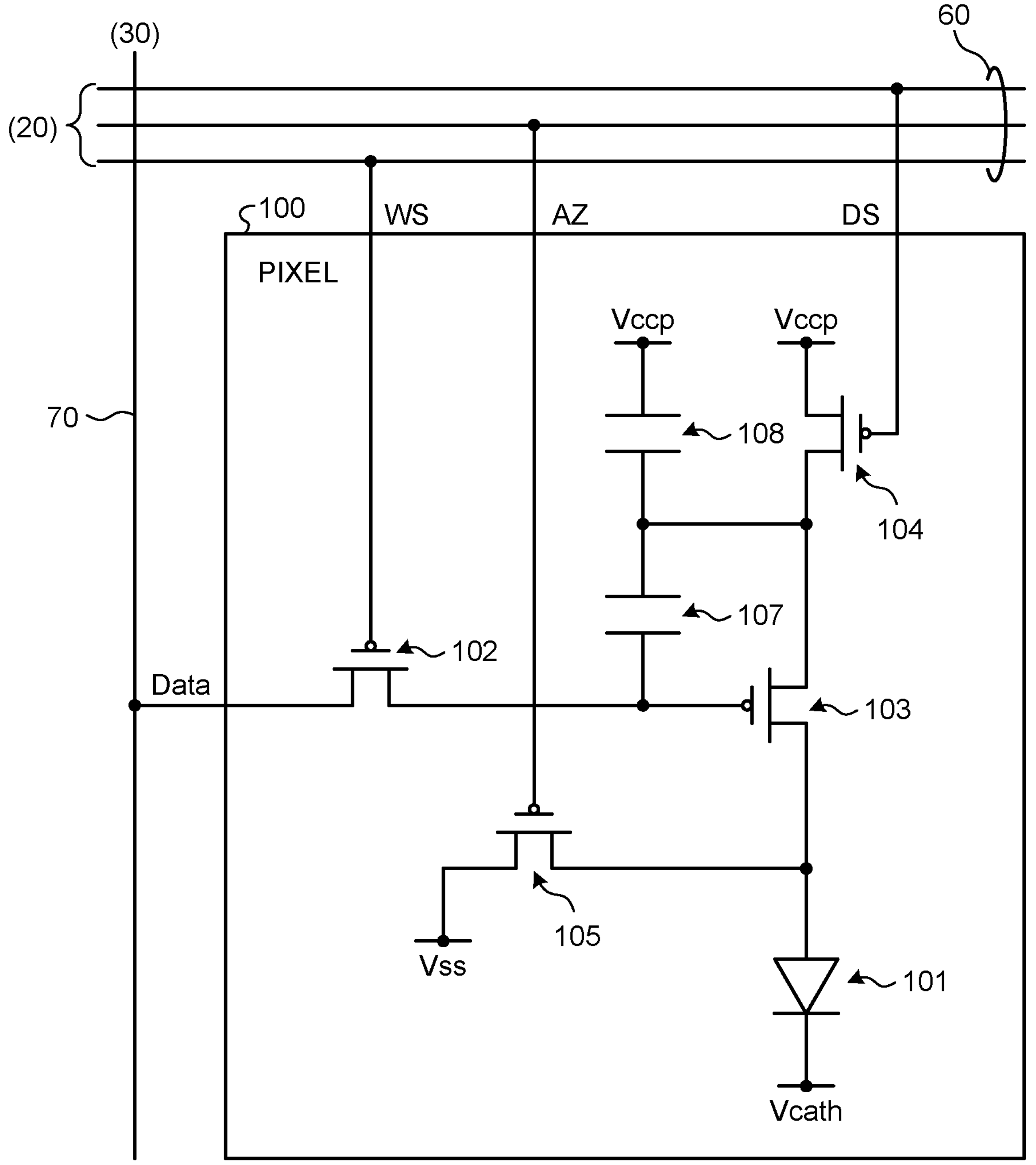
FIG. 2 is a diagram illustrating a configuration example of a pixel according to the first embodiment of the present disclosure.

FIG. 2 is a diagram illustrating a configuration example of a pixel according to the first embodiment of the present disclosure. The figure is a circuit diagram illustrating a configuration example of the pixel 100. The pixel 100 includes a light emitting element 101, a driving transistor 103, a sampling transistor 102, a light emission control transistor 104, a switching transistor 105, a holding capacitor 107, and an auxiliary capacitor 108. A p-channel MOS transistor can be used as the driving transistor 103, the sampling transistor 102, the light emission control transistor 104, and the switching transistor 105. As the p-channel MOS transistor, a MOS transistor including a back gate can be used. In this case, the back gate can be connected to a power supply line Vccp explained below. Note that the MOS transistor can be made conductive by applying a gate-source voltage Vgs exceeding a threshold voltage Vth to the gate. The gate-source voltage Vgs for bringing the MOS transistor into the conductive state is referred to as ON voltage. In the p-channel MOS transistor, the ON voltage applied to the gate is a low voltage for the source.

A signal line WS, a signal line AZ, a signal line DS, and a signal line Data are wired to the pixel 100. The signal line WS, the signal line AZ, and the signal line DS configure the row signal line 60 explained above. The signal line Data configures the data line 70 explained above. A power supply line Vccp, a power supply line Vss, and a power supply line Vcath are further wired to the pixel 100.

A cathode of the light emitting element 101 is connected to a power supply line Vcath and an anode of the light emitting element 101 is connected to a drain of the driving transistor 103 and a drain of the switching transistor 105. A source of the switching transistor 105 is connected to the power supply line Vss and a gate of the switching transistor 105 is connected to the signal line AZ. A gate of the driving transistor 103 is connected to a drain of the sampling transistor 102 and one end of the holding capacitor 107. The other end of the holding capacitor is connected to a source of the driving transistor 103, a drain of the light emission control transistor 104, and one end of the auxiliary capacitor 108. The other end of the auxiliary capacitor 108 is connected to the power supply line Vccp. A source of the light emission control transistor 104 is connected to the power supply line Vccp and a gate of the light emission control transistor 104 is connected to the signal line DS. A source of the sampling transistor 102 is connected to the signal line Data and a gate of the sampling transistor 102 is connected to the signal line WS.

Note that a circuit configured by the driving transistor 103, the sampling transistor 102, the light emission control transistor 104, the switching transistor 105, the holding capacitor 107, and the auxiliary capacitor 108 of the pixel 100 configures a pixel circuit. That is, circuits other than the light emitting element 101 in the pixel 100 configure a pixel circuit. This pixel circuit is a circuit that drives the light emitting element 101 by applying a current to the light emitting element 101.

As the light emitting element 101, for example, an organic EL element can be used. The light emitting element 101 irradiates light having luminance corresponding to a flowing current.

The driving transistor 103 is a transistor that feeds an electric current to the light emitting element 101 and drives the light emitting element 101.

The sampling transistor 102 samples an image signal transmitted by the signal line Data to thereby write the image signal in a gate node (a gate electrode) of the driving transistor 103. Note that the expression "write" here indicates that an image signal voltage is applied to the gate node and the potential of the gate node is retained at potential based on the image signal voltage. The sampling transistor 102 is controlled by a control signal transmitted by the signal line WS.

The light emission control transistor 104 is a transistor that controls light emission and non-light emission of the light emitting element 101. The light emission control transistor 104 is controlled by a light emission control signal transmitted by the signal line DS.

The switching transistor 105 is a transistor that controls the light emitting element 101 not to emit light during a non-light emission period of the light emitting element 101. The switching transistor 105 is controlled by a control signal transmitted by the signal line AZ. When the switching transistor 105 comes into the conductive state, a path bypassing the light emitting element 101 is formed and the light emission of the light emitting element 101 is stopped.

The holding capacitor 107 is a capacitor that holds an image signal voltage Vsig written by the sampling by the sampling transistor 102. The driving transistor 103 drives the light emitting element 101 by feeding a driving current corresponding to the holding voltage of the holding capacitor 107 to the light emitting element 101.

The auxiliary capacitor 108 prevents a source voltage of the driving transistor 103 from fluctuating when the image signal voltage Vsig is written. The auxiliary capacitor 108 has an action of setting the gate-source voltage Vgs of the driving transistor 103 to the threshold voltage Vth of the driving transistor 103.

[Driving Method]

Figure 3:
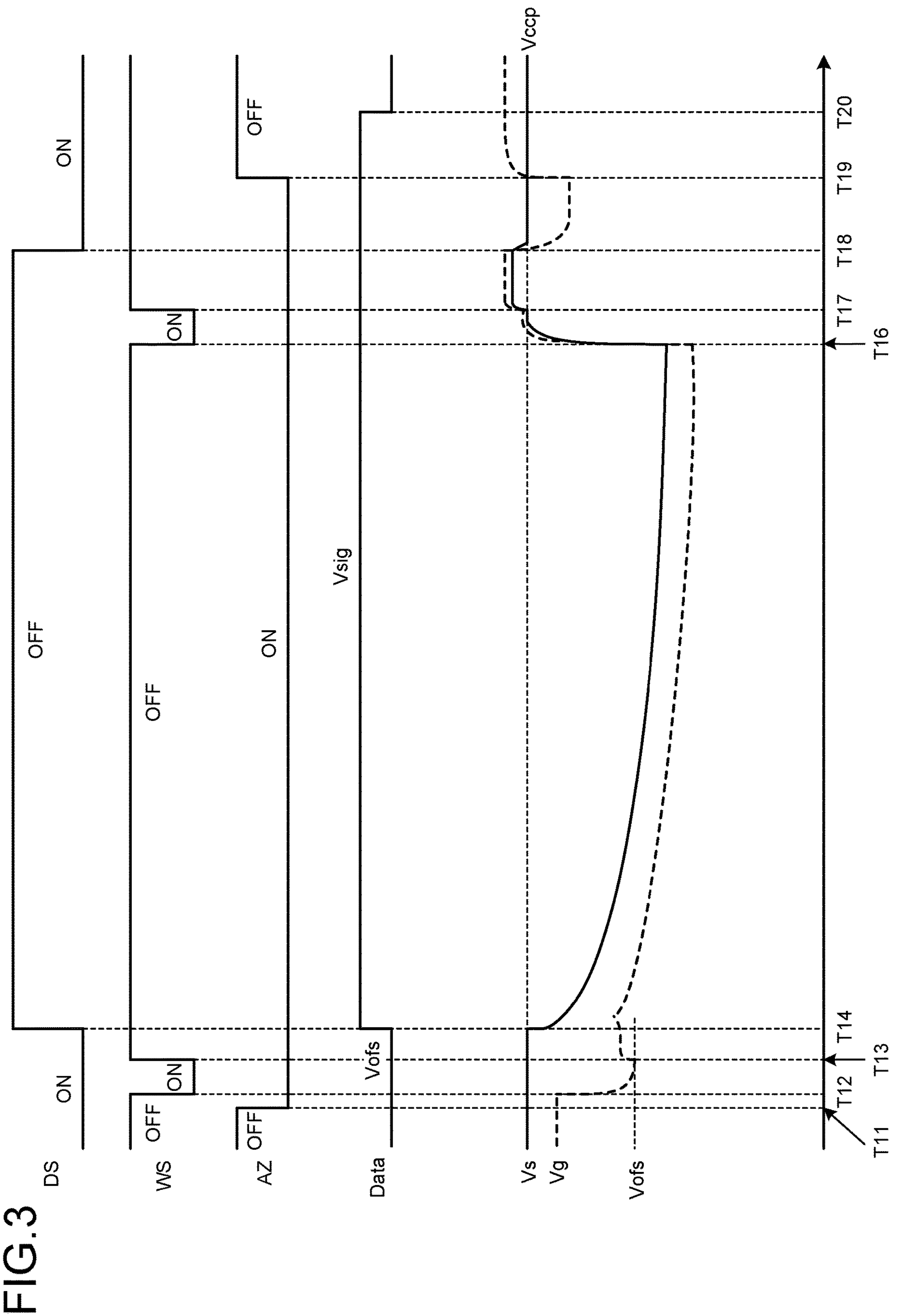
FIG. 3 is a diagram illustrating an example of a method of driving a pixel according to the first embodiment of the present disclosure.

FIG. 3 is a diagram illustrating an example of a pixel driving method according to the first embodiment of the present disclosure. FIG. 3 is a timing chart illustrating an example of a method of driving the light emitting element 101 in the pixel 100. "DS", "WS", and "AZ" in the figure respectively represent control signals transmitted by the signal line DS, the signal line WS, and the signal line AZ. A portion of a value "0" of these binarized control signals represents the ON voltage explained above. On the other hand, a portion of a value "1" represents the OFF voltage. "Data" in the figure represents the image signal voltage Vsig and a reference voltage Vofs transmitted by the signal line Data. "Vsig" and "Vofs" in the figure represent portions to which the image signal voltage Vsig and the reference voltage Vofs are applied. "Vs" and "Vg" in the figure represent a source voltage and a gate voltage Vg of the driving transistor 103.

In the initial state, an on-voltage is applied to the signal line DS, and the light emission control transistor 104 is brought into a conductive state. On the other hand, the OFF voltage is applied to the signal line WS and the signal line AZ. The reference voltage Vofs is applied to the signal line Data.

At T11, the ON voltage is applied to the signal line AZ and the switching transistor 105 comes into the conductive state. Consequently, an electric current flowing to the driving transistor 103 flows into the power supply line Vss via the switching transistor 105.

At T12, the ON voltage is applied to the signal line WS and the sampling transistor 102 comes into the conductive state. At this time, since the light emission control transistor 104 is in the conductive state, the power supply voltage Vccp is applied to a source node of the driving transistor 103. The reference voltage Vofs is written to the gate node of the driving transistor 103 via the sampling transistor 102.

At T13, the application of the ON voltage to the signal line WS is stopped and the sampling transistor 102 comes into a non-conductive state. Consequently, the writing of the reference voltage Vofs ends. An electric current flows to the driving transistor 103 by the writing of the reference voltage Vofs. This electric current flows into the power supply line Vss via the switching transistor 105. Therefore, the light emitting element 101 does not emit light.

At T14, the application of the ON voltage to the signal line DS is stopped and a light emission control transistor Tr3 comes into the non-conductive state. Consequently, the source node of the driving transistor 103 comes into a floating state. That is, after the reference voltage Vofs is written in the gate node of the driving transistor 103, the gate node and then the source node of the driving transistor 103 come into the floating state in this order. The image signal voltage Vsig is applied to the signal line Data.

Then, since both of the gate node and the source node of the driving transistor 103 come into the floating state, a self-discharge operation is performed. Discharge of the potential of the nodes in the self-discharge operation is performed through a path of the driving transistor 103, the switching transistor 105, and a current discharge destination node Vini. Then, both of a source voltage Vs and a gate voltage Vg of the driving transistor 103 gradually decrease according to the self-discharge operation. In the self-discharge operation, basically, the source voltage Vs and the gate voltage Vg of the driving transistor 103 decrease while maintaining the gate-source voltage Vgs.

At T16, the ON voltage is applied to the signal line WS and the sampling transistor 102 comes into the conductive state. Consequently, a signal voltage Vsig=Vccp is written by the sampling by the sampling transistor 102 while the source node of the driving transistor 103 is kept in the floating state. Note that the potential Vccp indicates the potential of the power supply voltage Vcc.

At T17, the write operation for the image signal voltage Vsig is completed. Consequently, the source voltage Vs of the driving transistor 103 is fixed to the power supply voltage Vccp (a non-floating state). At this time, the gate voltage Vg of the driving transistor 103 rises according to bootstrap operation.

At T18, the ON voltage is applied to the signal line DS and the light emission control transistor 104 is brought into the conductive state. The gate voltage Vg of the light emission control transistor 104 drops and the gate voltage Vg of the driving transistor 103 becomes lower than the source voltage Vs.

At T19, the application of the ON voltage to the signal line AZ is stopped and the switching transistor 105 comes into the non-conductive state. Consequently, a driving current flows to the light emitting element 101 and the light emitting element 101 starts light emission. Thereafter, at T20, the application of the image signal voltage Vsig to the signal line Data is stopped.

[Configuration of the Pixel Array Unit]

Figure 4:
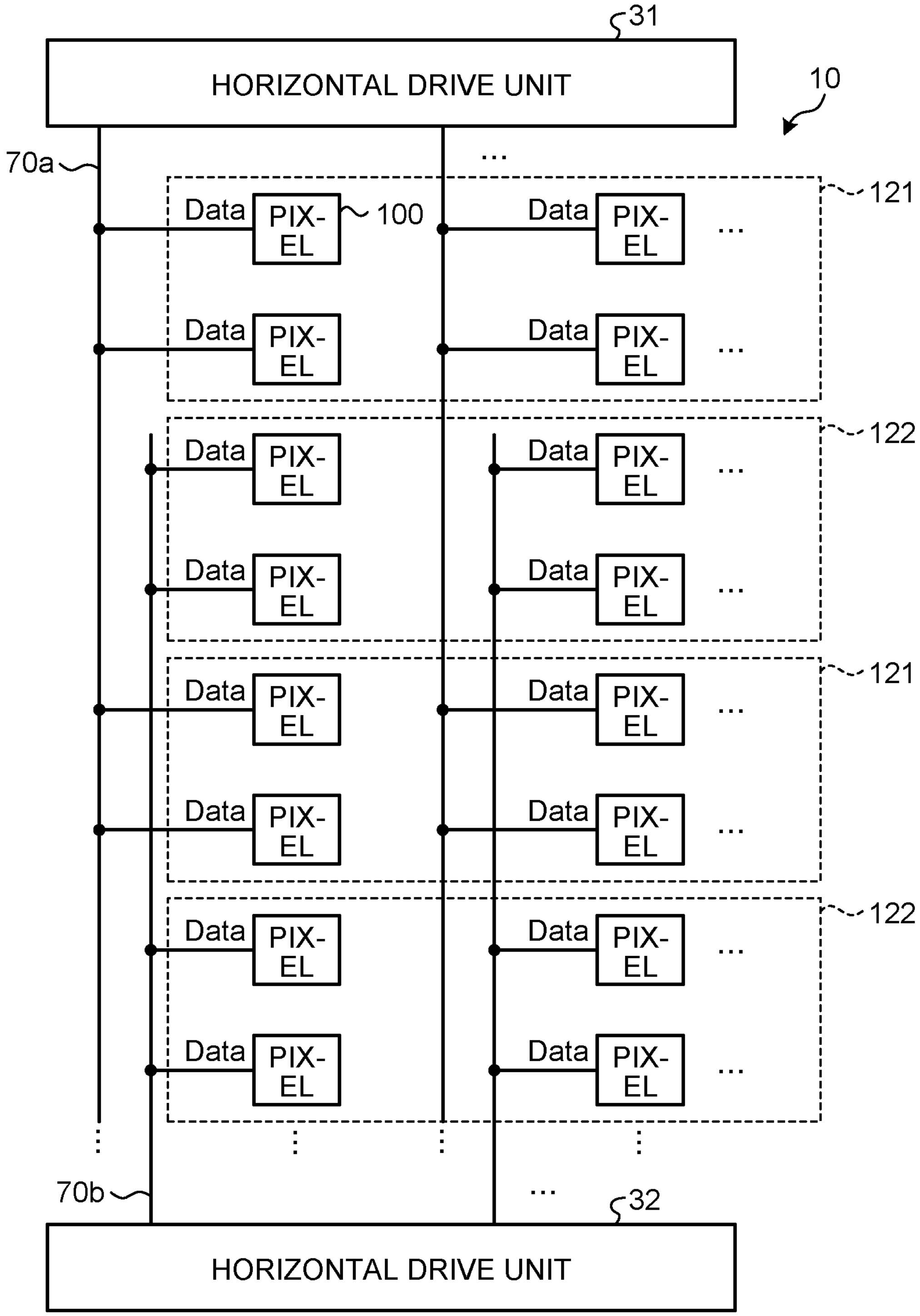
FIG. 4 is a diagram illustrating a configuration example of a pixel array unit according to the first embodiment of the present disclosure.

FIG. 4 is a diagram illustrating a configuration example of the pixel array unit according to the first embodiment of the present disclosure. The figure is a diagram illustrating a configuration example of the pixel array unit 10. In the figure, the row signal line 60 is not illustrated. Note that horizontal drive units 31 and 32 are illustrated in the figure. The horizontal drive unit 31 generates an image signal for the pixels 100 arranged on the upper side of the pixel array unit 10 in the figure and arranged in a first pixel group 121 explained below. A horizontal drive unit 32 generates an image signal for the pixels 100 arranged on the opposite side of the pixel array unit 10 with respect to the horizontal drive unit 31 and arranged in a second pixel group 122 explained below. The pixels 100 of the pixel array unit 10 are arranged in either the first pixel group 121 or the second pixel group 122. Note that the horizontal drive unit 31 is an example of the first image signal generation unit. The horizontal drive unit 32 is an example of the second image signal generation unit.

The first pixel group 121 is configured by the pixels 100 arranged in a plurality of rows of the pixel array unit 10. An image signal is transmitted to the pixels 100 of the first pixel group 121 in the figure via a data line 70*a*. The data line 70*a* in the figure is connected to the horizontal drive unit 31 and transmits an image signal generated by the horizontal drive unit 31.

The second pixel group 122 is configured by the pixels 100 arranged in a plurality of rows adjacent to the first pixel group 121. An image signal is transmitted to the pixels 100 of the second pixel group 122 in the figure via a data line 70*b* different from the data line 70*a*. The data line 70*b* in the figure is connected to the horizontal drive unit 32 and transmits an image signal generated by the horizontal drive unit 32.

An example is illustrated in which the first pixel group 121 and the second pixel group 122 in the figure are respectively configured by the pixels 100 arranged in two rows in the pixel array unit 10. The first pixel group 121 and the second pixel group 122 in the figure represent an example in which the first pixel group 121 and the second pixel group 122 are configured by the pixels 100 arranged in a plurality of adjacent rows of the pixel array unit 10.

The pixel array unit 10 in the figure illustrates an example in which the first pixel groups 121 and the second pixel groups 122 are alternately arranged. The data line 70*a* is connected in common to the pixels 100 of a plurality of first pixel groups 121 and the data line 70*b* is connected in common to the pixels 100 of a plurality of second pixel groups 122.

[Image Display Example]

Figure 5A:
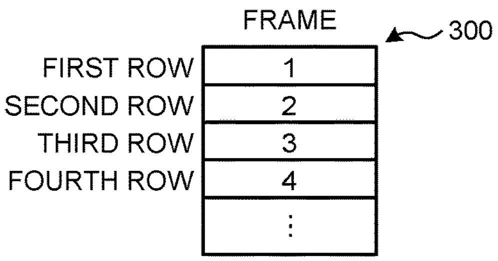
FIG. 5A is a diagram illustrating an example of a display method according to the first embodiment of the present disclosure.

FIG. 5A is a diagram illustrating an example of a display method according to the first embodiment of the present disclosure. The figure is a diagram illustrating an example of a method of displaying an image in the display device 1 and is a view illustrating a configuration of a frame. Here, the frame represents a unit of an image displayed by the pixel array unit 10. A frame 300 in the figure is configured by an image for each of a plurality of rows. A rectangle in the drawing represents an image for each of the rows. Numbers added to rectangles in the figure represent row numbers of the image data input to the display device 1. The description such as "first row" in the figure corresponds to a row in the pixel array unit 10. The frame 300 in the figure represents an example in which input image data and an image displayed on the pixels 100 of the pixel array unit 10 coincide in units of rows. Such a display method is referred to as a line sequential method.

Figure 5B:
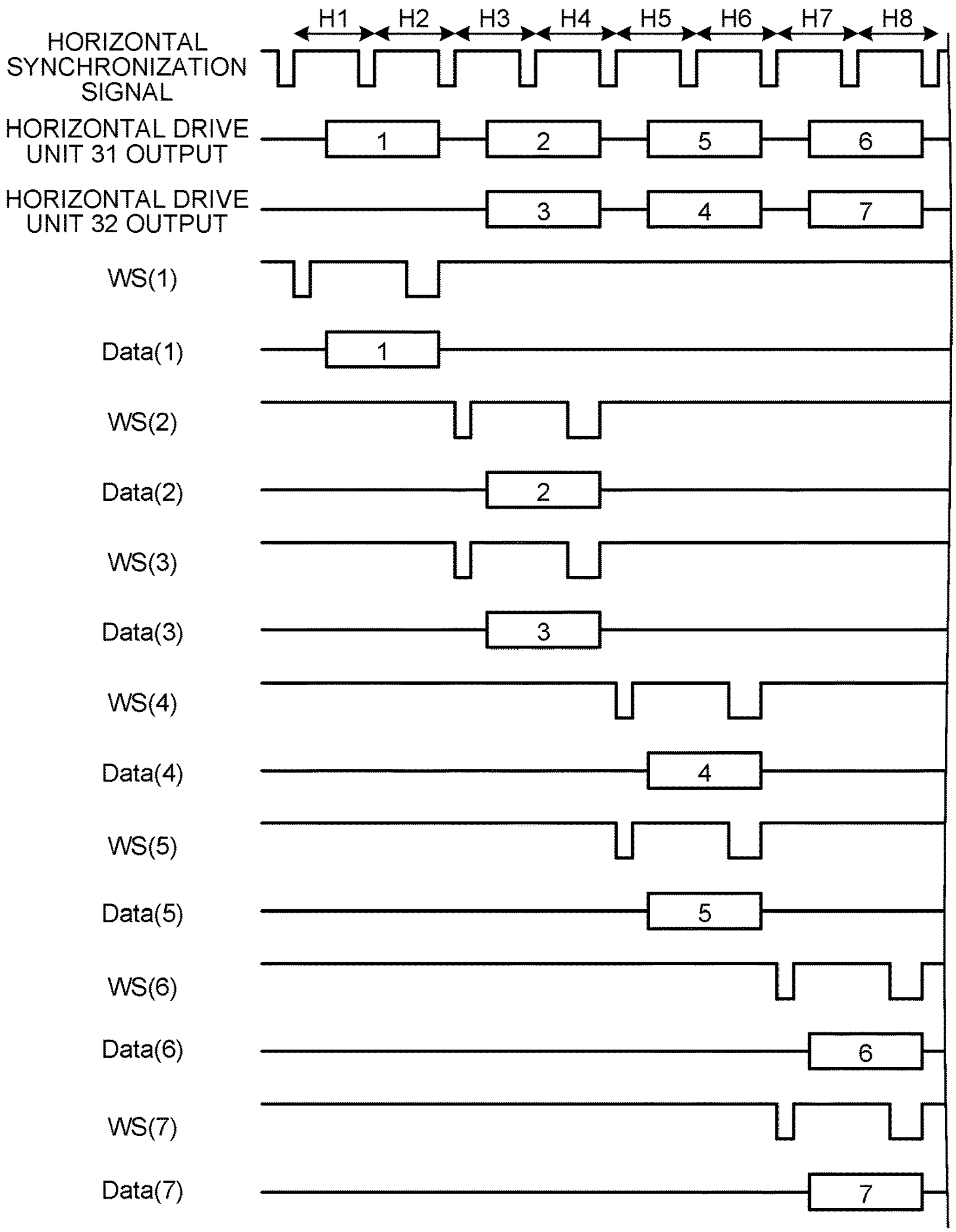
FIG. 5B is a diagram illustrating the example of the display method according to the first embodiment of the present disclosure.

FIG. 5B is a view illustrating the example of the display method according to the first exemplary embodiment of the present disclosure. The figure is a diagram illustrating the example of the method of displaying an image in the display device 1 and is a timing chart illustrating image signals and drive signals. A procedure for displaying the frame 300 in FIG. 5A is explained with reference to FIG. 5.

In the figure, a "horizontal synchronization signal" represents a waveform of a horizontal synchronization signal that is a signal indicating a delimiter of an image for one row. A period of the horizontal synchronization signal in time series is identified by a description such as "H1". The "horizontal drive unit 31" and the "horizontal drive unit 32" respectively represent image signals output from the horizontal drive unit 31 and the horizontal drive unit 32. Rectangular regions in the "horizontal drive unit 31" and the "horizontal drive unit 32" represent image signals. Numbers added to the rectangles represent row numbers of image data. "WS" represents a waveform of a control signal of the signal line WS. Note that numbers in parentheses represent row numbers of the pixel array unit 10. "Data" represents image signals captured in the pixel circuits of the pixels 100 via the signal line Data. Rectangular regions in "Data" represent image signals. Numbers added to the rectangles represent row numbers of image data. Numbers in parentheses represent row numbers of the pixel array unit 10. Note control signals other than control signals of the signal line WS are not illustrated.

First, in periods of H1 and H2, an image signal of a first row of the image data is output from the horizontal drive unit 31. This image signal is transmitted to the pixels 100 in a first row of the pixel array unit 10 via the data line 70*a*. This image signal is written into the driving transistor 103 in the period of H2.

Next, in periods of H3 and H4, an image signal of a second row of the image data is output from the horizontal drive unit 31 and an image signal of a third row of the image data is output from the horizontal drive unit 32. These image signals are respectively transmitted to the pixels 100 in a second row and the pixels 100 in a third row of the pixel array unit 10 via the data lines 70*a* and 70*b*. These image signals are respectively written in the driving transistor 103 during the period of H4.

Next, in periods of H5 and H6, an image signal of a fifth row of the image data is output from the horizontal drive unit 31 and an image signal of a fourth row of the image data is output from the horizontal drive unit 32. These image signals are transmitted to the pixels 100 in a fifth row and the pixels 100 in a fourth row of the pixel array unit 10 via the data lines 70*a* and 70*b*. These image signals are written in the driving transistor 103 during in a period of H6.

Next, in periods of H7 and H8, an image signal of a sixth row of the image data is output from the horizontal drive unit 31 and an image signal of a seventh row of the image data is output from the horizontal drive unit 32. These image signals are respectively transmitted to the pixels 100 in a sixth row and the pixels 100 in a seventh row of the pixel array unit 10 via the data lines 70*a* and 70*b*. These image signals are respectively written to the driving transistor 103 in the period of H8.

Thereafter, image signals are output from the horizontal drive units 31 and 32 and transmitted to the pixels 100 in the same procedure. Consequently, the frame 300 illustrated in FIG. 5A can be displayed.

[Another Example of Image Display]

Figure 6A:
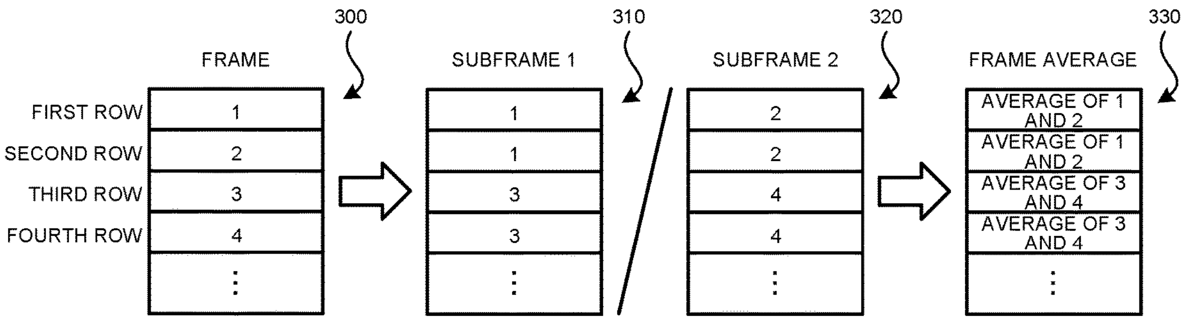
FIG. 6A is a diagram illustrating another example of the display method according to the first embodiment of the present disclosure.

FIG. 6A is a diagram illustrating another example of the display method according to the first embodiment of the present disclosure. Like FIG. 5A, the figure is a diagram illustrating an example of the method of displaying an image in the display device 1. The display method in FIG. 6A is different from the display method in FIG. 5A in that the frame 300 is divided into two subframes.

In the method illustrated in the figure, the frame 300 is divided into a subframe 310 and a subframe 320. In the subframe 310, images in odd-numbered rows of the frame 300 are respectively arranged in two rows. Specifically, an image in a first row of the frame 300 is arranged in a first row and a second row of the subframe 310 and an image in a third row of the frame 300 is arranged in a third row and a fourth row of the subframe 310. In the subframe 320, image data in even-numbered rows of the frame 300 is respectively arranged in two rows. Specifically, an image in a second row of the frame 300 is arranged in a first row and a second row of the subframe 320 and an image in a fourth row of the frame 300 is arranged in a third row and a fourth row of the subframe 320. The input image data can be displayed by alternately displaying the subframes 310 and 320 on the display device 1.

A frame average 330, which is a frame visually recognized by a person, is an image configured by an average of images arranged in the same row of the subframes 310 and 320. The method in the figure is a display method that. although resolution is halved, can improve response speed for display of a moving image compared with the line sequential method in FIG. 5A.

Figure 6B:
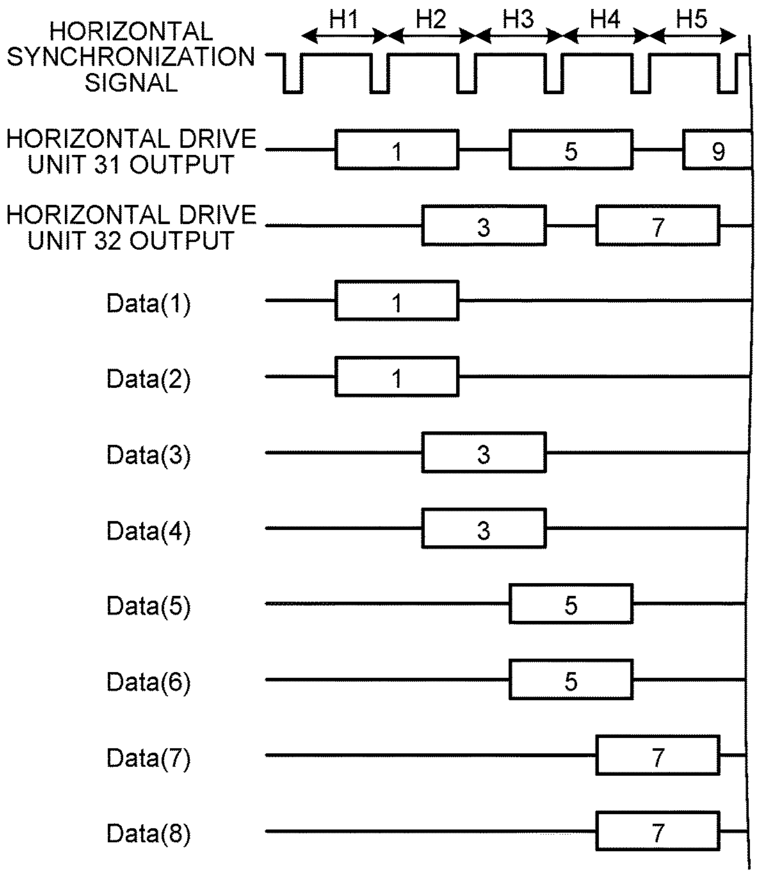
FIG. 6B is a diagram illustrating the other example of the display method according to the first embodiment of the present disclosure.

FIG. 6B is a diagram illustrating another example of the display method according to the first embodiment of the present disclosure. Like FIG. 5B, the figure is a diagram illustrating an example of the image display method in the display device 1 and is a timing chart illustrating image signals and drive signals. Note that, in the figure, a waveform of the signal line WS is further not illustrated. A procedure for displaying the subframe 310 in FIG. 6A is explained with reference to the figure.

First, in periods of H1 and H2, an image signal of a first row of the image data is output from the horizontal drive unit 31. This image signal is transmitted to the pixels 100 of the first row and the second row of the pixel array unit 10 via the data line 70*a*. This image signal is written into the driving transistor 103 in the period of H2.

Next, in periods of H2 and H3, an image signal in a third row of the image data is output from the horizontal drive unit 32. This image signal is transmitted to the pixels 100 in the third row and the fourth row of the pixel array unit 10 via the data line 70*b*. This image signal is written in the driving transistor 103 during the period of H3.

Next, during periods of H3 and H4, an image signal in a fifth row of the image data is output from the horizontal drive unit 31. This image signal is transmitted to the pixels 100 in the fifth row and the sixth row of the pixel array unit 10 via the data line 70*a*. This image signal is written into the driving transistor 103 in the period of H2.

Next, in periods of H4 and H5, an image signal in a seventh row of the image data is output from the horizontal drive unit 32. This image signal is transmitted to the pixels 100 in the third row and the fourth row of the pixel array unit 10 via the data line 70*b*. This image signal is written in the driving transistor 103 during the period of H3.

Thereafter, image signals are output from the horizontal drive units 31 and 32 and transmitted to the pixels 100 in the same procedure. Consequently, the subframe 310 illustrated in FIG. 6A can be displayed.

In the subframe 320 as well, image signals ins even-numbered row of the image data can be alternately output from the horizontal drive units 31 and 32 and generated by the same procedure as the procedure in FIG. 6B. By alternately generating and displaying the subframes 310 and 320, the display illustrated in FIG. 6A can be performed.

As illustrated in FIG. 4, in the display device 1 according to the first embodiment of the present disclosure, the pixels 100 of the pixel array unit 10 are arranged to be divided into the first pixel group 121 and the second pixel group 122 and an image signal is transmitted for each of pixel groups. Therefore, image signals can be simultaneously transmitted to the pixels 100 in a plurality of rows arranged in the same pixel group. In the display device 1 according to the first embodiment of the present disclosure, the data lines 70*a* and 70*b* are individually for the first pixel group 121 and the second pixel group 122 to transmit image signals. Therefore, the image signals can be simultaneously transmitted to the first pixel group 121 and the second pixel group 122. Consequently, an image signal can be transmitted at high speed in the display method illustrated in FIG. 6A and a frame rate can be improved.

As explained above, the display device 1 according to the first embodiment of the present disclosure displays an image for one row with the pixels 100 in one row of the pixel array unit 10. Therefore, the configuration of the display device 1 can be simplified. In the display device 1 according to the first embodiment of the present disclosure, the pixels 100 of the pixel array unit 10 are arranged to be divided into the first pixel group 121 and the second pixel group 122 and the data lines 70*a* and 70*b* are arranged to individually transmit an image signal for each of the pixel groups. Therefore, besides the line sequential method, a display method for alternately repeating the subframe 310 including the images of the odd-numbered rows of the image data and the subframe 320 including the images of the even-numbered rows of the image data can be applied. An image signal can be transmitted to the pixels 100 at high speed in the display method for alternately repeating the subframe 310 and the subframe 320.

2. Second Embodiment

In the display device 1 of the first embodiment explained above, the data lines 70*a* and 70*b* are respectively connected to the pixels 100 of the first pixel group 121 and the pixels 100 of the second pixel group 122. In contrast, the display device 1 according to a second embodiment of the present disclosure is different from the first embodiment explained above in that a signal line for transmitting an image signal is selected and the image signal is transmitted to the pixels 100 of the first pixel group 121 and the pixels 100 of the second pixel group 122.

[Configuration of the Pixel Array Unit]

Figure 7:
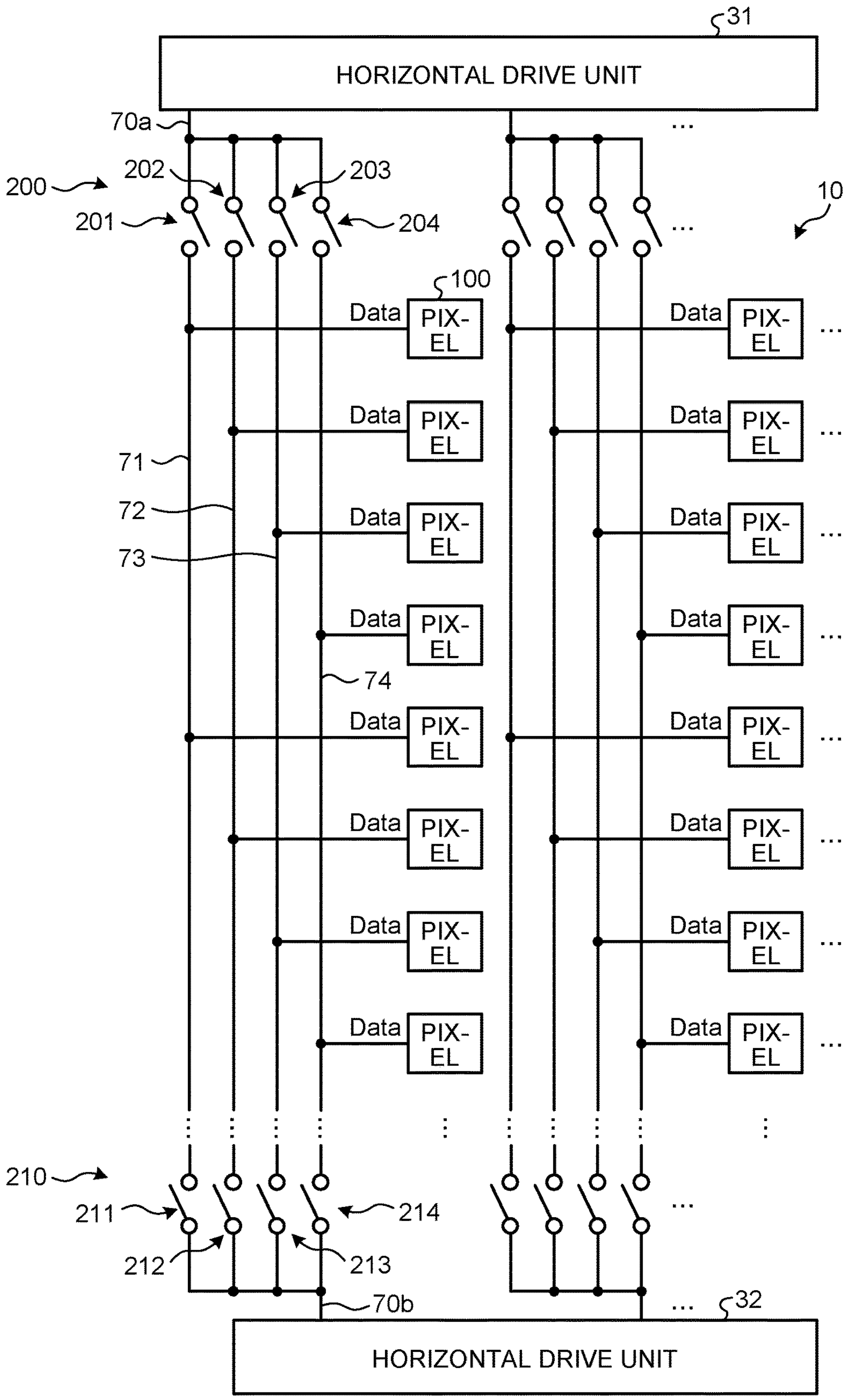
FIG. 7 is a diagram illustrating a configuration example of a pixel array unit according to a second embodiment of the present disclosure.

FIG. 7 is a diagram illustrating a configuration example of a pixel array unit according to a second embodiment of the present disclosure. Like FIG. 4, the figure is a diagram illustrating a configuration example of the pixel array unit 10. The pixel array unit 10 in the figure is different from the pixel array unit 10 in FIG. 4 in further including second data lines 71 to 74 and switch elements 201 to 204 and 211 to 214.

The second data lines 71 to 74 are data lines respectively connected to rows of two pixel groups of the first pixel group 121 and the second pixel group 122. In the pixel array unit 10 in the figure, the second data line 71 is connected to the pixels 100 in a first row, the second data line 72 is connected to the pixels 100 in a second row, the second data line 73 is connected to the pixels 100 in a third row, and the second data line 74 is connected to the pixels 100 in a fourth row. Subsequently, the second data lines 71 to 74 are periodically connected to the pixels 100 for each number of rows (4 rows in the figure) of the first pixel group 121 and the second pixel group 122.

Switch elements 201 to 204 and switch elements 211 to 214 are disposed at both ends of the second data lines 71 to 74. These switch elements can be configured by, for example, MOS transistors. The switch element 201 is connected between the data line 70*a* and the second data line 71 and the switch element 202 is connected between the data line 70*a* and the second data line 72. The switch element 203 is connected between the data line 70*a* and the second data line 73 and the switch element 204 is connected between the data line 70*a* and the second data line 74. The switch element 211 is connected between the data line 70*b* and the second data line 71 and the switch element 212 is connected between the data line 70*b* and the second data line 72. The switch element 213 is connected between the data line 70*b* and the second data line 73 and the switch element 214 is connected between the data line 70*b* and the second data line 74.

By switching conduction and non-conduction of the switch elements 201 to 204, any one of the second data lines 71 to 74 can be selected and connected to the data line 70*a*. By switching conduction and non-conduction of the switch elements 211 to 214, any of the second data lines 71 to 74 can be selected and connected to the data line 70*b*. In the following explanation, the switch elements 201 to 204 are referred to as second data line selection unit 200. The switch elements 211 to 214 are referred to as second data line selection unit 210. The arrangement of the first pixel group 121 and the second pixel group 122 can be switched by changing the selection of the second data line in the second data line selection units 200 and 210. This is explained with reference to FIG. 8 and FIG. 9.

Figure 8:
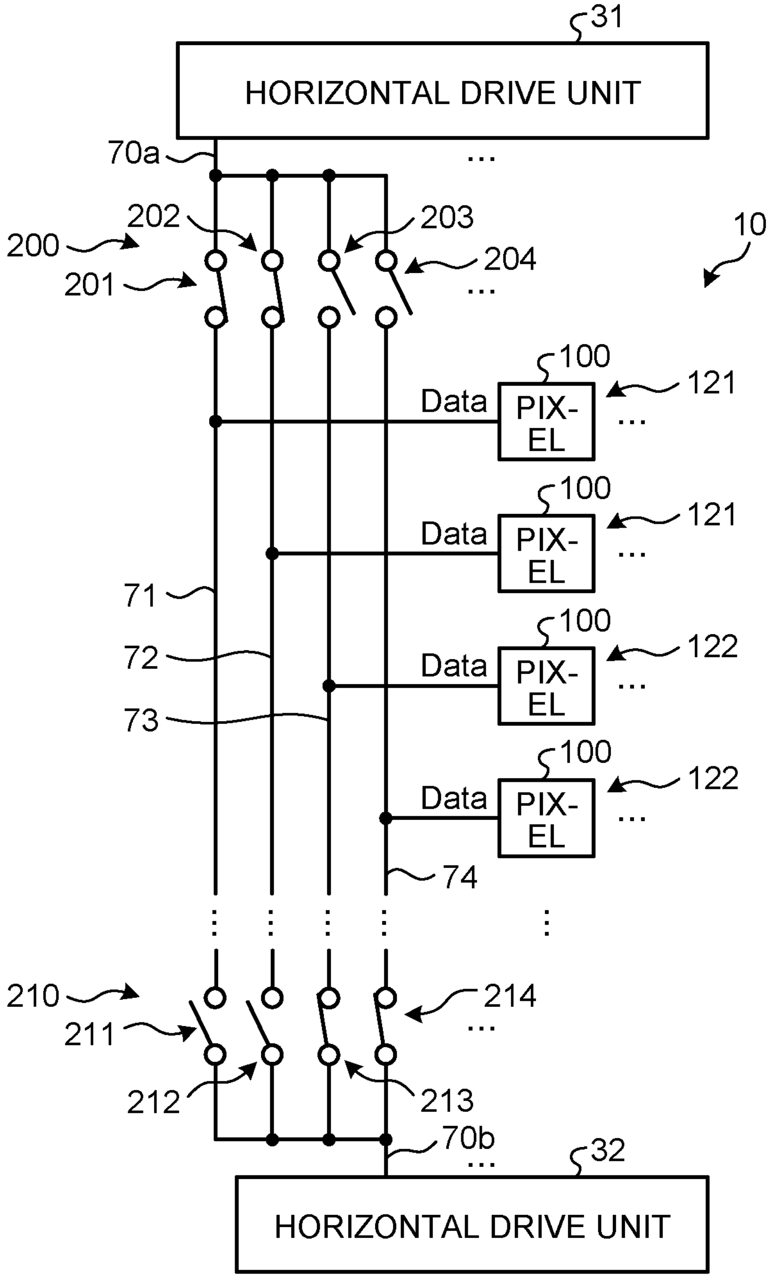
FIG. 8 is a diagram illustrating a configuration example of a pixel array unit according to the second embodiment of the present disclosure.

FIG. 8 is a diagram illustrating a configuration example of a pixel array unit according to the second embodiment of the present disclosure. FIG. 8 is a diagram illustrating an example of a selected state of the second data line selection units 200 and 210 in the pixel array unit 10. In the pixel array unit 10 in the figure, the pixels 100 connected to the second data lines 71 and 72 are assumed as the pixels 100 included in the first pixel group 121. The pixels 100 connected to the second data lines 73 and 74 are assumed as the pixels 100 included in the second pixel group 122.

In this case, the switch elements 201 and 202 of the second data line selection unit 200 are brought into the conductive state and the switch elements 203 and 204 of the second data line selection unit 200 are brought into the non-conductive state. The switch elements 213 and 214 are brought into the conductive state and the switch elements 211 and 212 of the second data line selection unit 210 are brought into the non-conductive state. Consequently, the pixels 100 in the first row and the second row of the pixel array unit 10 can be arranged in the first pixel group 121 and the pixels 100 in the third row and the fourth row of the pixel array unit 10 can be arranged in the second pixel group 122.

Figure 9:
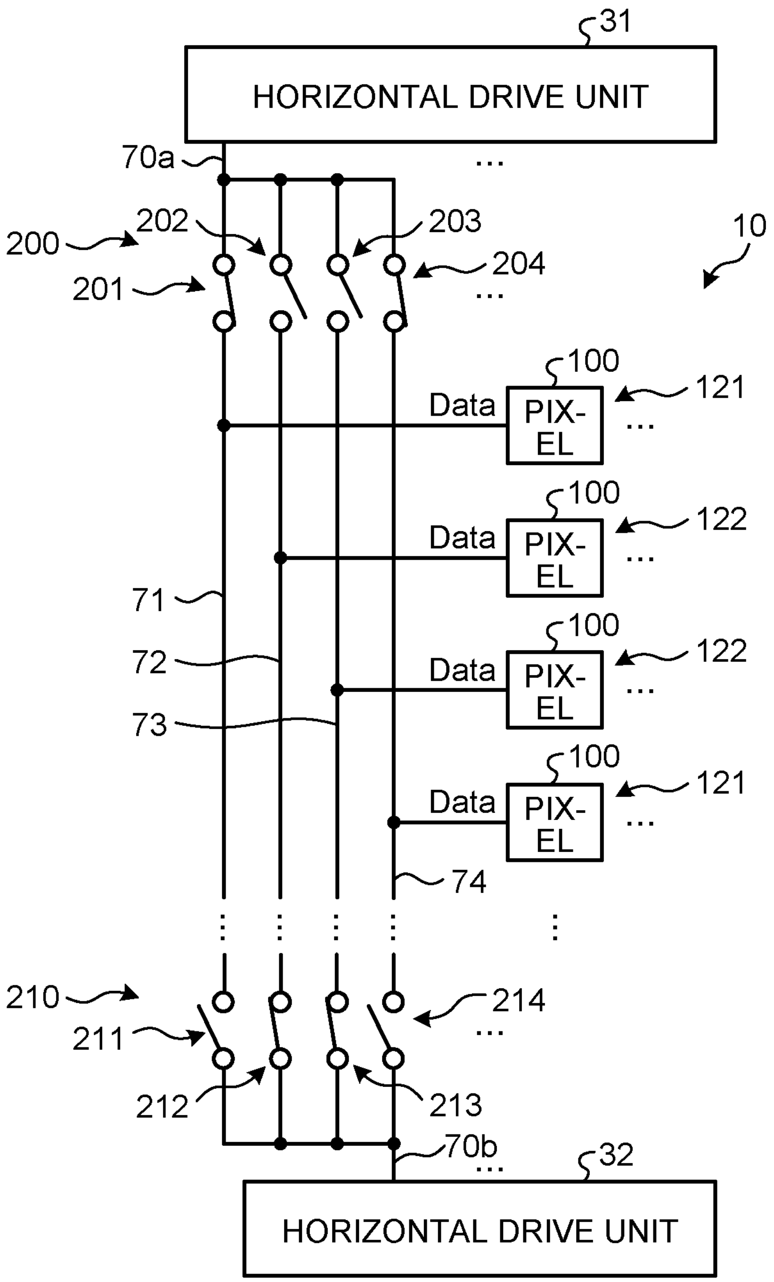
FIG. 9 is a diagram illustrating a configuration example of a pixel array unit according to the second embodiment of the present disclosure.

FIG. 9 is a diagram illustrating a configuration example of a pixel array unit according to the second embodiment of the present disclosure. The figure is a diagram for explaining another example of the selected state of the second data line selection units 200 and 210 in the pixel array unit 10. In the pixel array unit 10 in the figure, the pixels 100 connected to the second data lines 71 and 74 are assumed as the pixels 100 included in the first pixel group 121. The pixels 100 connected to the second data lines 72 and 73 are assumed as the pixels 100 included in the second pixel group 122.

In this case, the switch elements 201 and 204 of the second data line selection unit 200 are brought into the conductive state and the switch elements 202 and 203 of the second data line selection unit 200 are brought into the non-conductive state. The switch elements 212 and 213 of the second data line selection unit 210 are brought into the conductive state and the switch elements 211 and 214 of the second data line selection unit 210 are brought into the non-conductive state. Consequently, the pixels 100 in the first row and the fourth row of the pixel array unit 10 can be arranged in the first pixel group 121 and the pixels 100 in the second row and the third row of the pixel array unit 10 can be arranged in the second pixel group 122.

In the pixel array unit 10 in FIG. 8 and FIG. 9, a display method for alternately repeating the subframe 310 and the subframe 320 explained with reference to FIG. 6A can be applied.

By changing the selection of the second data lines 71 to 74 in the second data line selection units 200 and 210 in this way, the arrangement of the first pixel group 121 and the second pixel group 122 can be changed.

A display method for alternately repeating the selection of the second data line in the second data line selection units 200 and 210 in FIG. 8 and the selection of the second data line in the second data line selection units 200 and 210 in FIG. 9 can also be used. A display method in this case is explained with reference to FIG. 10.

[Image Display Example]

Figure 10:
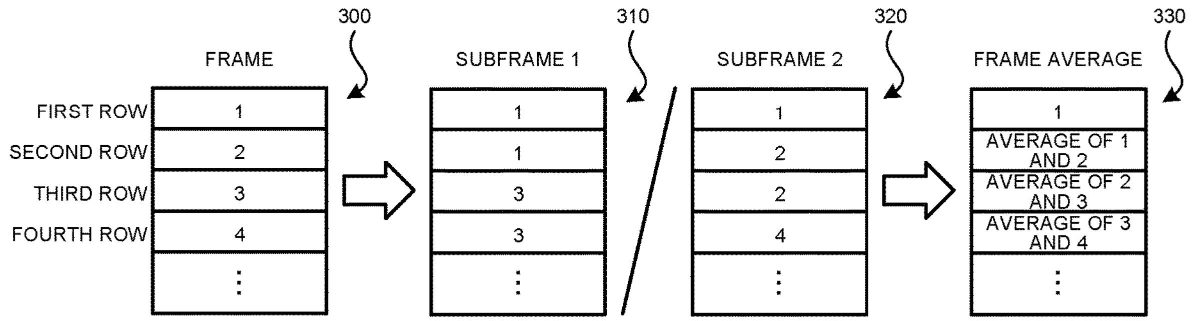
FIG. 10 is a diagram illustrating an example of a display method according to the second embodiment of the present disclosure.

FIG. 10 is a diagram illustrating an example of a display method according to the second embodiment of the present disclosure. Like FIG. 5A, the figure is a diagram illustrating an example of the method of displaying an image in the display device 1. The display method in FIG. 10 is different from the display method in FIG. 6A in that arrangement positions of the images in the even-numbered rows configuring the subframe 320 shift by one row.

The subframe 310 in the figure can be displayed by adopting the selection of the second data line in the second data line selection units 200 and 210 illustrated in FIG. 8. The subframe 320 in the figure can be displayed by adopting the selection of the second data line in the second data line selection units 200 and 210 illustrated in FIG. 9. In this case, the subframe 320 is configured by images in even-numbered rows except that images in odd-numbered rows are arranged in the first row.

The frame average 330 is an average of rows having different combinations except for the first row. Compared with the display method illustrated in FIG. 6A, an image having high resolution can be obtained.

Note that, when the line sequential method explained with reference to FIG. 5A is applied, the switch elements 201 and 203 of the second data line selection unit 200 are brought into the conductive state and the switch elements 202 and 204 of the second data line selection unit 200 are brought into the non-conductive state. The switch elements 212 and 214 of the second data line selection unit 210 are brought into the conductive state and the switch elements 211 and 213 of the second data line selection unit 210 are brought into the non-conductive state.

The configuration of the display device 1 other than this is similar to the configuration of the display device 1 in the first embodiment of the present disclosure. Therefore, explanation of the configuration is omitted.

As explained above, in the display device 1 according to the second embodiment of the present disclosure, the second data line selection units 200 and 210 are disposed and the second data lines 71 to 74 connected to the pixels 100 of the first pixel group 121 and the second pixel group 122 are selected. Consequently, the line sequential method and the display method for alternately repeating the subframe 310 and the subframe 320 can be applied in the pixel array unit 10. A display method for switching the rows arranged in the first pixel group 121 and the second pixel group 122 in the subframe 310 and the subframe 320 can also be applied. Consequently, convenience of the display device 1 can be improved.

3. Third Embodiment

In the display device 1 of the second embodiment explained above, the second data line selection units 200 and 210 are disposed. In contrast, the display device 1 according to a third embodiment of the present disclosure is different from the second embodiment explained above in that the display device 1 includes a selection unit (a pixel input signal selection unit) that selects a data line for each of the pixels 100.

[Configuration of a Pixel]

Figure 11:
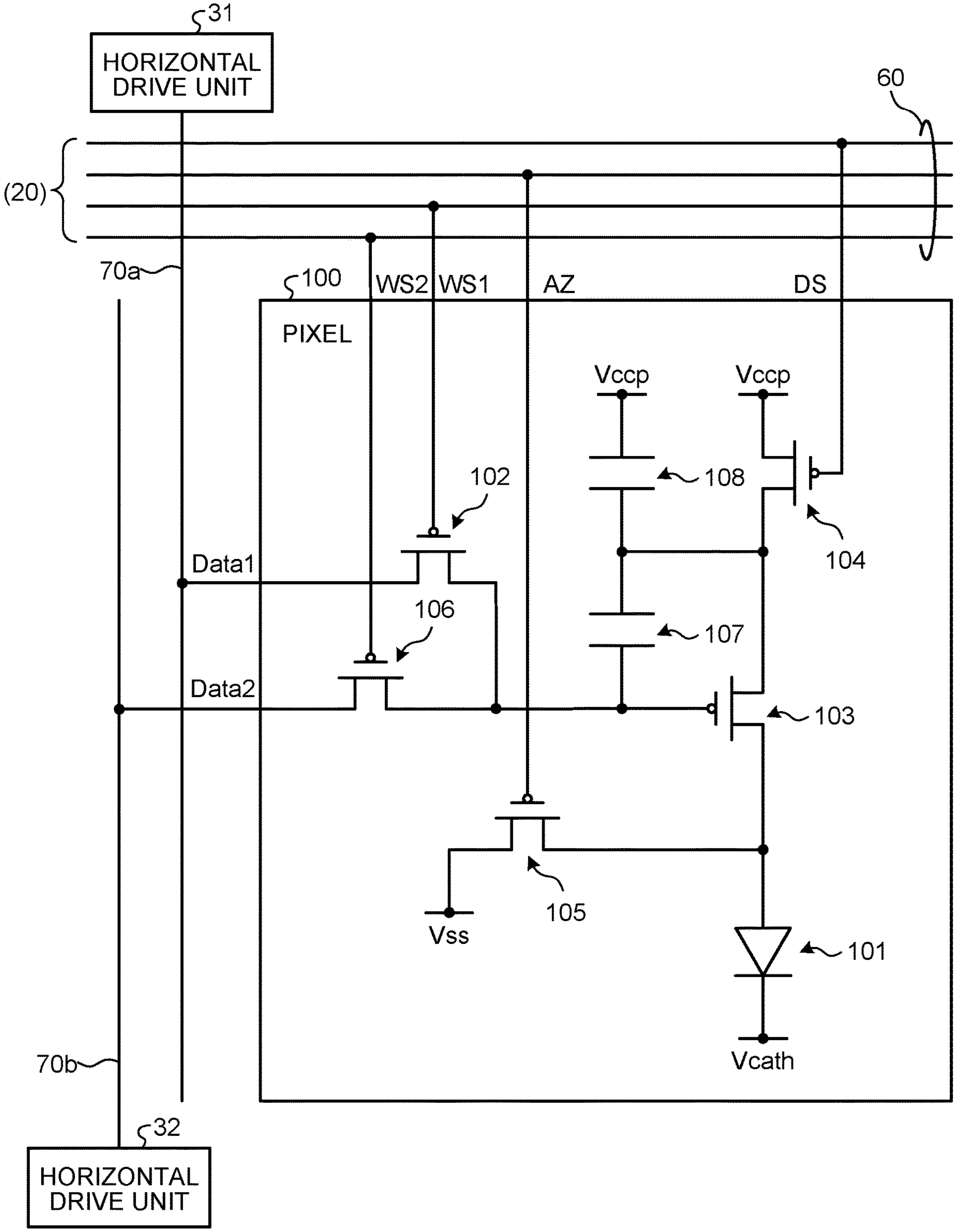
FIG. 11 is a diagram illustrating a configuration example of a pixel according to a third embodiment of the present disclosure.

FIG. 11 is a diagram illustrating a configuration example of a pixel according to the third embodiment of the present disclosure. Like FIG. 2, the figure is a circuit diagram illustrating a configuration example of the pixel 100. The pixel 100 in the figure is different from the pixel 100 in FIG. 2 in that a sampling transistor 106 is further disposed. The sampling transistor 106 can be configured by a p-channel MOS transistor. A signal line Data1 and a signal line Data2 are wired to the pixel 100 in the figure. The signal line Data1 is connected to the data line 70*a* and the signal line Data2 is connected to the data line 70*b*. A drain of the sampling transistor 106 is connected to a drain of the sampling transistor 102. A source of the sampling transistor 106 is connected to the signal line Data2. A gate of the sampling transistor 106 is connected to the signal line WS2. Note that a source of the sampling transistor 102 is connected to the signal line Data1 and a gate of the sampling transistor 102 is connected to the signal line WS1. Since connections of the circuits other than the above are similar to those of the circuit in FIG. 2, explanation of the connections is omitted.

By applying a control signal to one of the signal lines WS1 and WS2, the sampling transistors 102 and 106 for sampling an image signal can be selected. When the sampling transistor 102 is selected, an image signal transmitted by the data line 70*a* is sampled and written in the driving transistor 103. The pixel 100 in this case is included in the first pixel group 121. On the other hand, when the sampling transistor 106 is selected, an image signal transmitted by the data line 70*b* is sampled and written in the driving transistor 103. The pixel 100 in this case is included in the second pixel group 122. Note that the sampling transistors 102 and 106 are an example of the pixel input signal selection unit. The data line 70*a* in the figure is an example of the first pixel group data line. The data line 70*b* in the figure is an example of the second pixel group data line.

[Configuration of the Pixel Array Unit]

Figure 12:
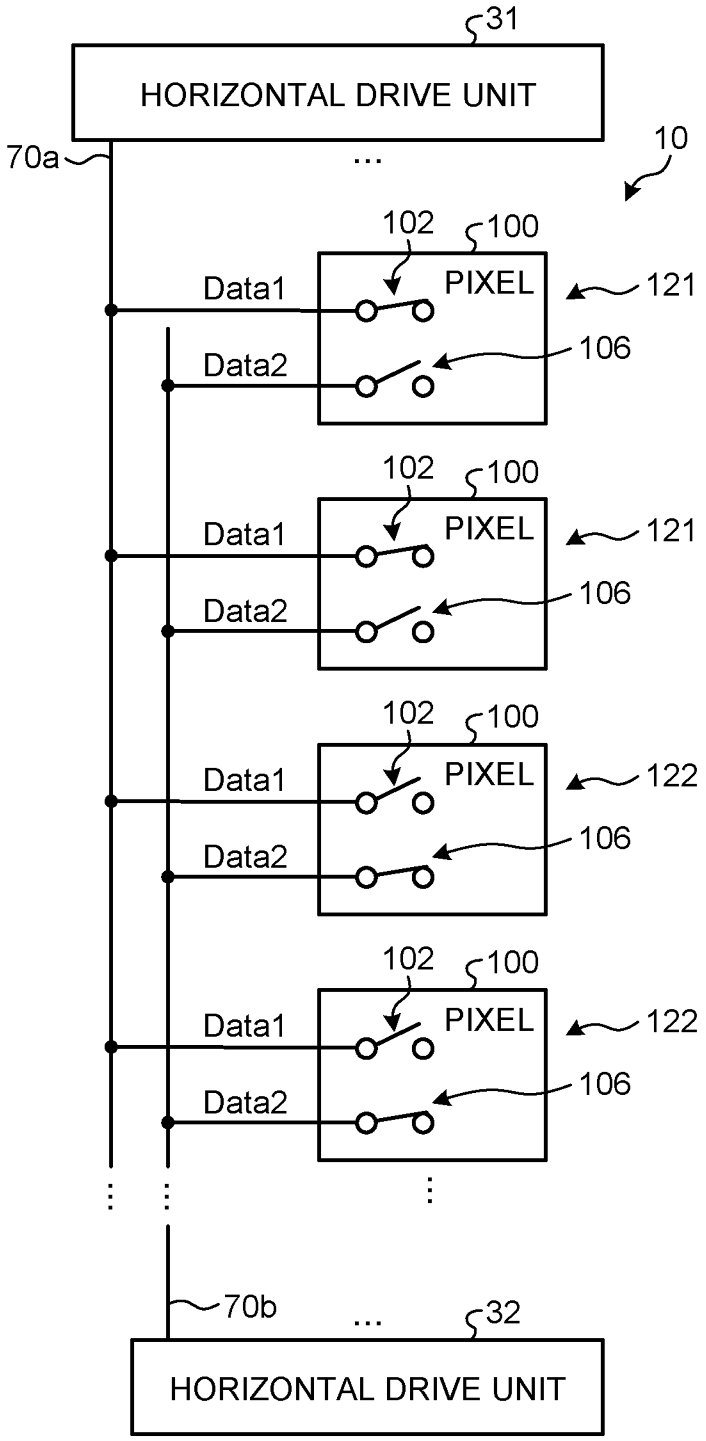
FIG. 12 is a diagram illustrating a configuration example of a pixel array unit according to the third embodiment of the present disclosure.

FIG. 12 is a diagram illustrating a configuration example of a pixel array unit according to the third embodiment of the present disclosure. Like FIG. 4, the figure is a diagram illustrating a configuration example of the pixel array unit 10. The pixel array unit 10 in the figure is different from the pixel array unit 10 in FIG. 4 in that the pixel 100 in FIG. 11 is arranged.

In the pixel 100 in the figure, the sampling transistors 102 and 106 are simplified and illustrated. As illustrated in the figure, an image signal is transmitted, via the data line 70*a*, from the horizontal drive unit 31 to the pixels 100 in the first row and the second row that make the sampling transistor 102 conductive at the time of sampling. The pixels 100 in the first row and the second row are included in the first pixel group 121. An image signal is transmitted, via the data line 70*b*, from the horizontal drive unit 32 to the pixels 100 in the third row and the fourth row that make the sampling transistor 106 conductive at the time of sampling. The pixels 100 in the third row and the fourth row are included in the second pixel group 122.

As explained above, the pixel 100 in the figure can select one of the data line 70*a* and the data line 70*b* by switching the conduction and non-conduction states of the sampling transistors 102 and 106. Consequently, one of the image signal of the first pixel group 121 or the image signal of the second pixel group 122 can be selected.

The configuration of the display device 1 other than this is similar to the configuration of the display device 1 in the first embodiment of the present disclosure. Therefore, explanation of the configuration is omitted.

As explained above, the display device 1 according to the third exemplary embodiment of the present disclosure can select the data lines 70*a* and 70*b* for the pixel 100. The convenience of the display device 1 can be improved.

4. Fourth Embodiment

In the display device 1 in the first embodiment explained above, the horizontal drive units 31 and 32 are respectively disposed on the different sides of the pixel array unit 10. In contrast, the display device 1 according to a fourth embodiment of the present disclosure is different from the first embodiment explained above in that horizontal drive units 31 and 32 are disposed on the same side of the pixel array unit 10.

[Configuration of the Horizontal Drive Unit]

Figure 13:
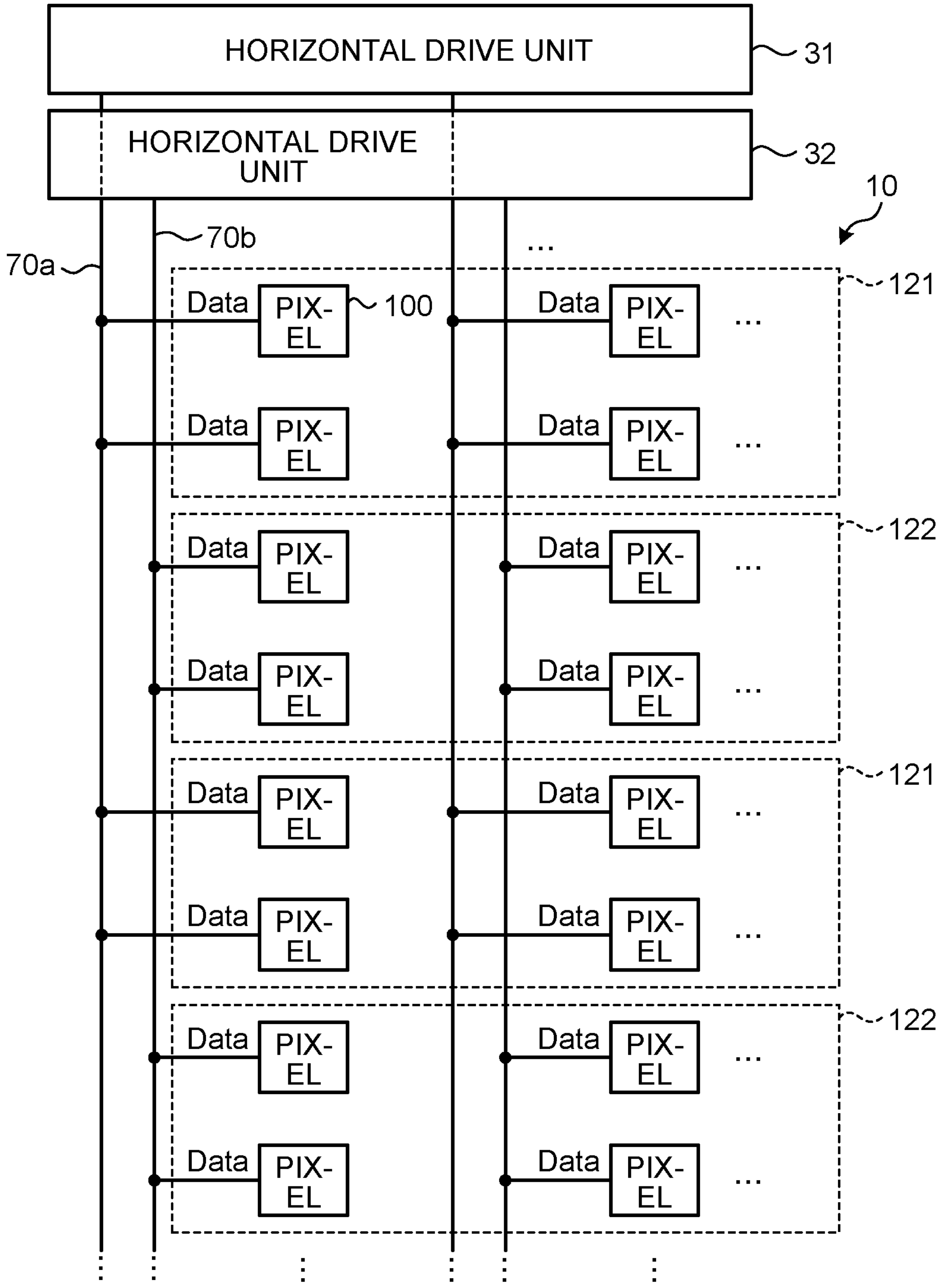
FIG. 13 is a diagram illustrating a configuration example of a horizontal drive unit according to a fourth embodiment of the present disclosure.

FIG. 13 is a diagram illustrating a configuration example of a horizontal drive unit according to the fourth embodiment of the present disclosure. The figure is a diagram illustrating a disposition example of the horizontal drive units 31 and 32. The horizontal drive units 31 and 32 in the figure are different from the horizontal drive units 31 and 32 in FIG. 4 in that the horizontal drive units 31 and 32 in the figure are disposed on the same side of the pixel array unit 10.

The configuration of the display device 1 other than this is similar to the configuration of the display device 1 in the first embodiment of the present disclosure. Therefore, explanation of the configuration is omitted.

5. Modifications

The display device 1 in the first embodiment explained above includes the pixels 100 including the four transistors. However, the pixels 100 having another configuration can also be applied.

[Configuration of a Pixel]

Figure 14:
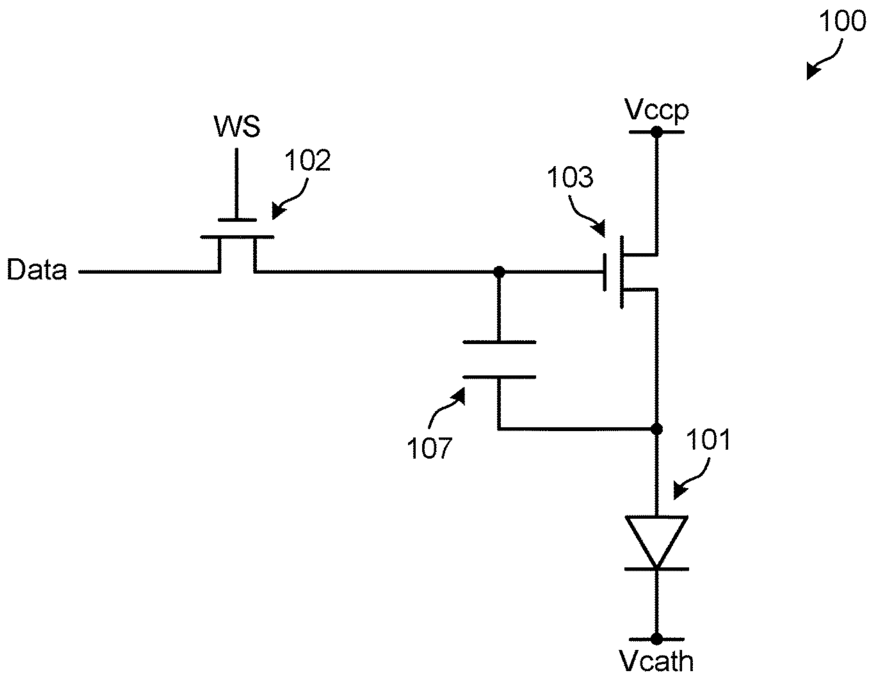
FIG. 14 is a diagram illustrating a configuration example of a pixel according to a modification of an embodiment of the present disclosure.

FIG. 14 to FIG. 19 are diagrams illustrating configuration examples of pixels according to modified examples of an embodiment of the present disclosure. The pixel 100 in FIG. 14 represents an example in the case in which the light emission control transistor 104, the switching transistor 105, and the auxiliary capacitor 108 in the pixel 100 in FIG. 2 are omitted. The sampling transistor 102 and the driving transistor 103 in the figure are configured by n-channel MOS transistors.

Figure 15:
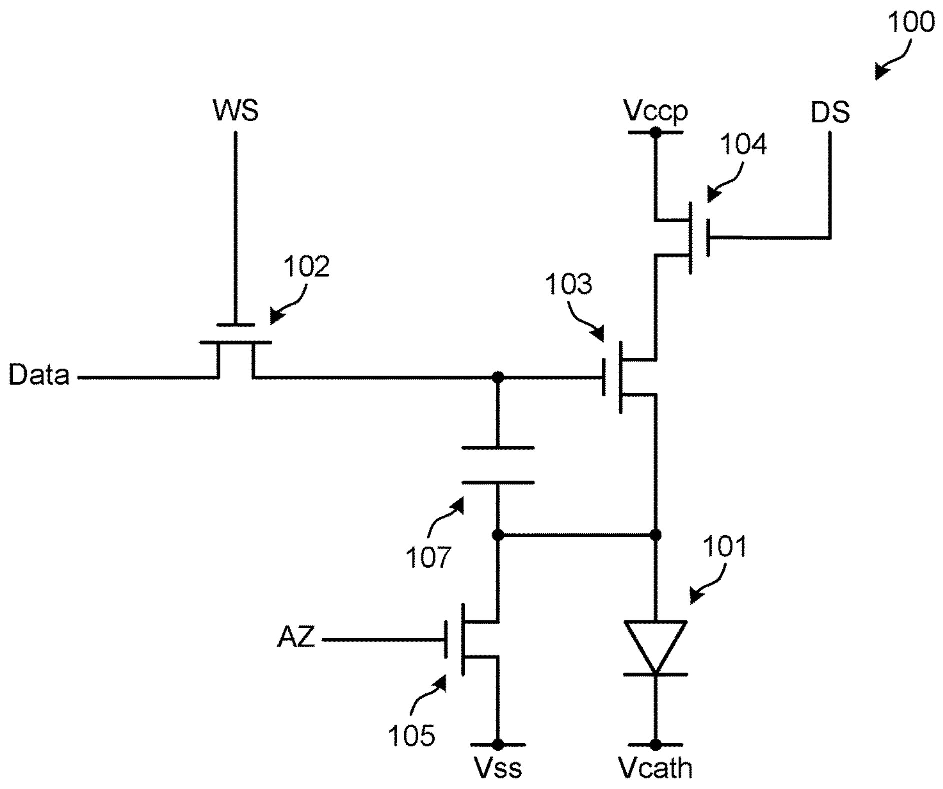
FIG. 15 is a diagram illustrating a configuration example of a pixel according to a modification of the embodiment of the present disclosure.

The pixel 100 in FIG. 15 is an example in which the p-channel MOS transistor of the pixel 100 in FIG. 2 is changed to an n-channel MOS transistor. Note that, in the pixel 100 in the figure, the auxiliary capacitor 108 can be omitted.

Figure 16:
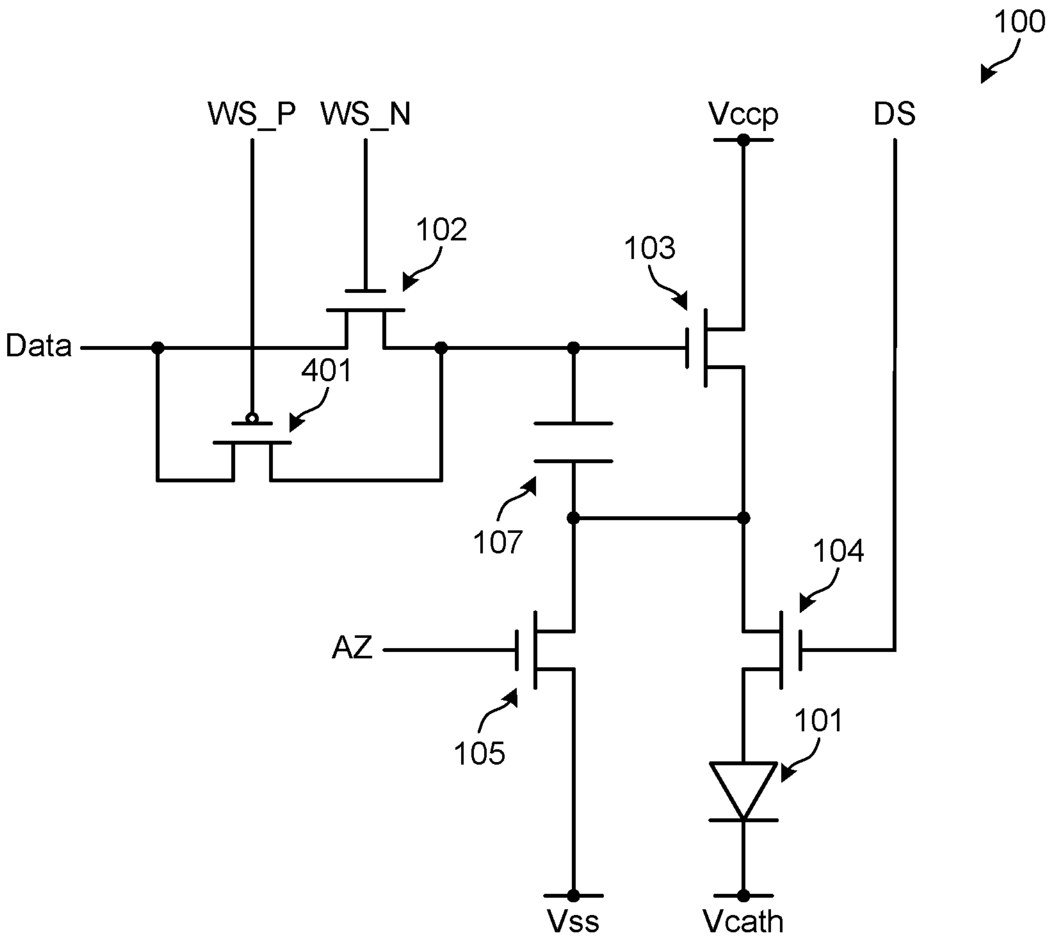
FIG. 16 is a diagram illustrating a configuration example of a pixel according to a modification of the embodiment of the present disclosure.

The pixel 100 in FIG. 16 represents an example in the case in which a sampling transistor 401 by a p-channel MOS transistor is connected in parallel to the sampling transistor 102 by the n-channel MOS transistor.

Figure 17:
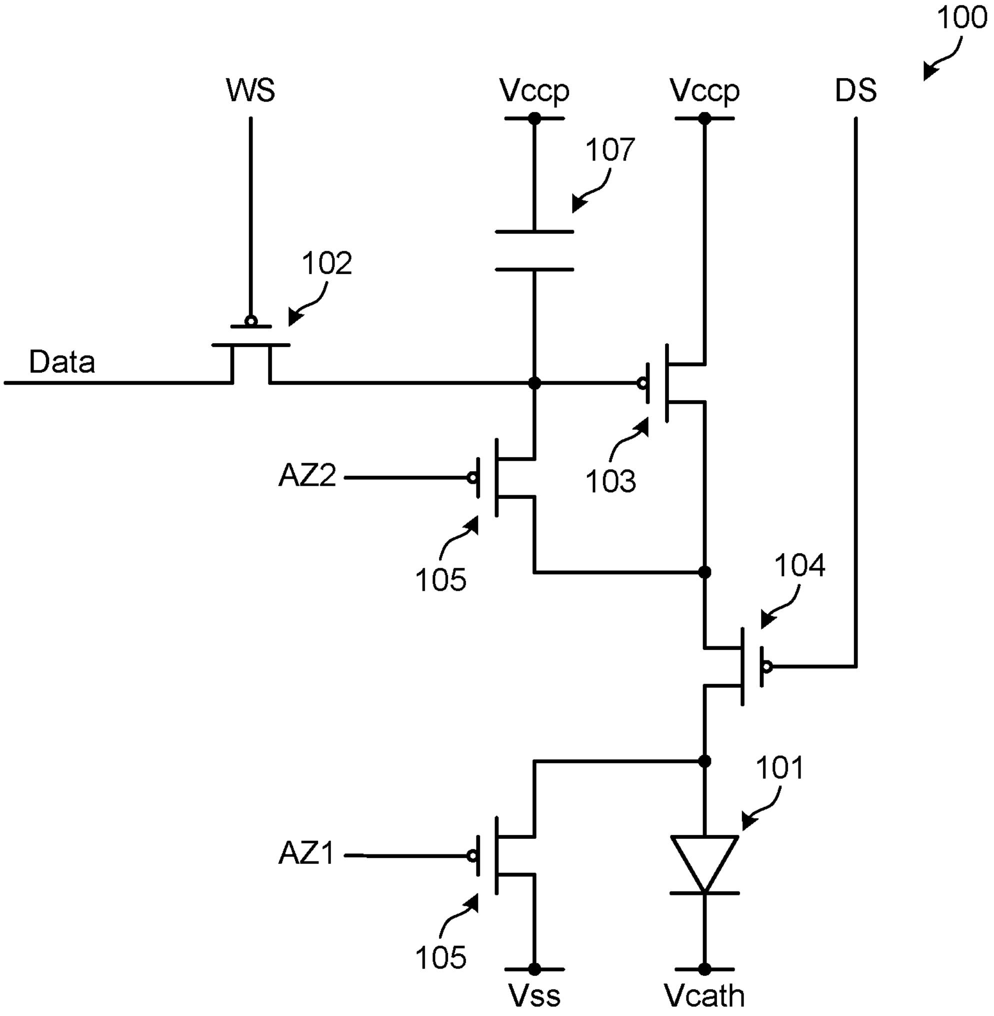
FIG. 17 is a diagram illustrating a configuration example of a pixel according to a modification of the embodiment of the present disclosure.

The pixel 100 in FIG. 17 represents an example in the case in which two switching transistors are used.

Figure 18:
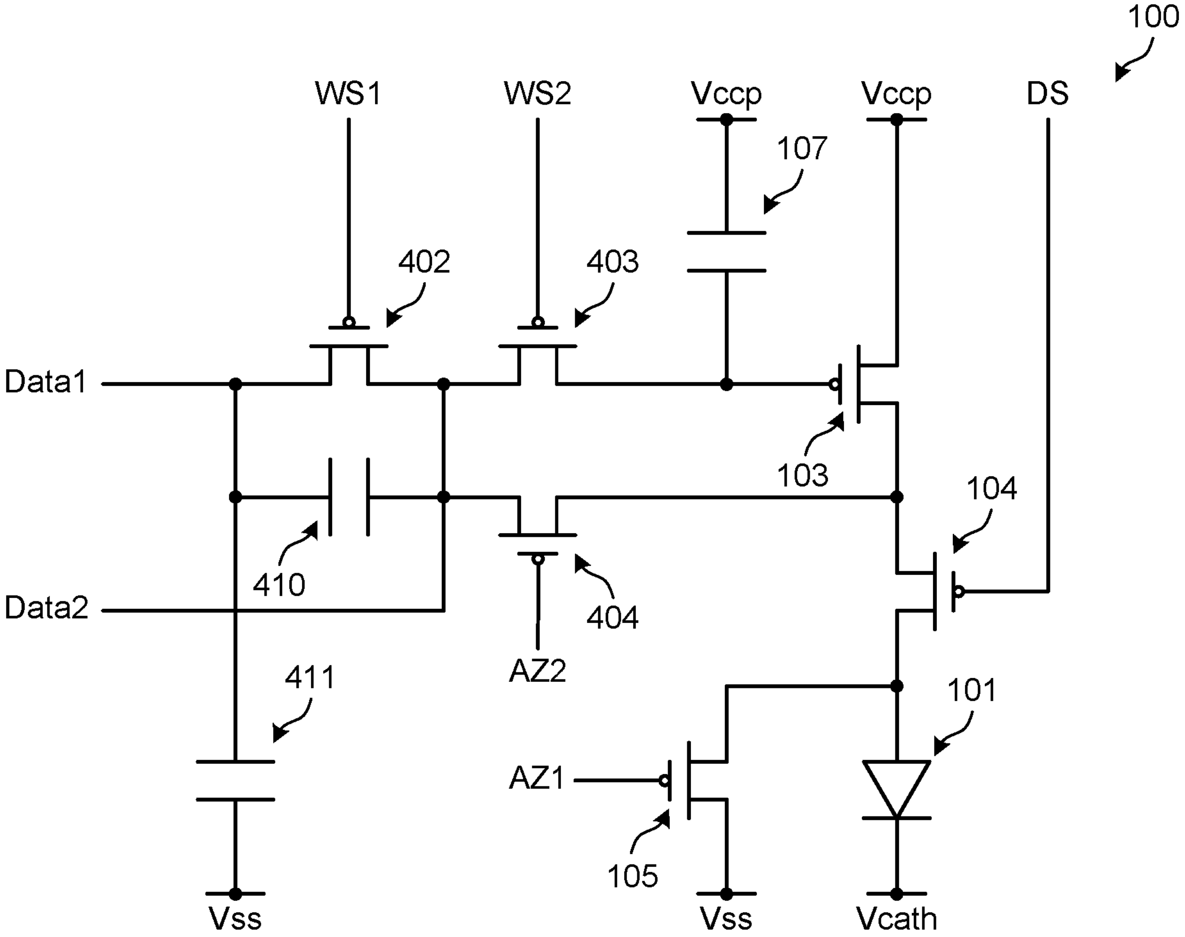
FIG. 18 is a diagram illustrating a configuration example of a pixel according to a modification of the embodiment of the present disclosure.

The pixel 100 in FIG. 18 represents an example in the case in which two switching transistors and two sampling transistors are used.

Figure 19:
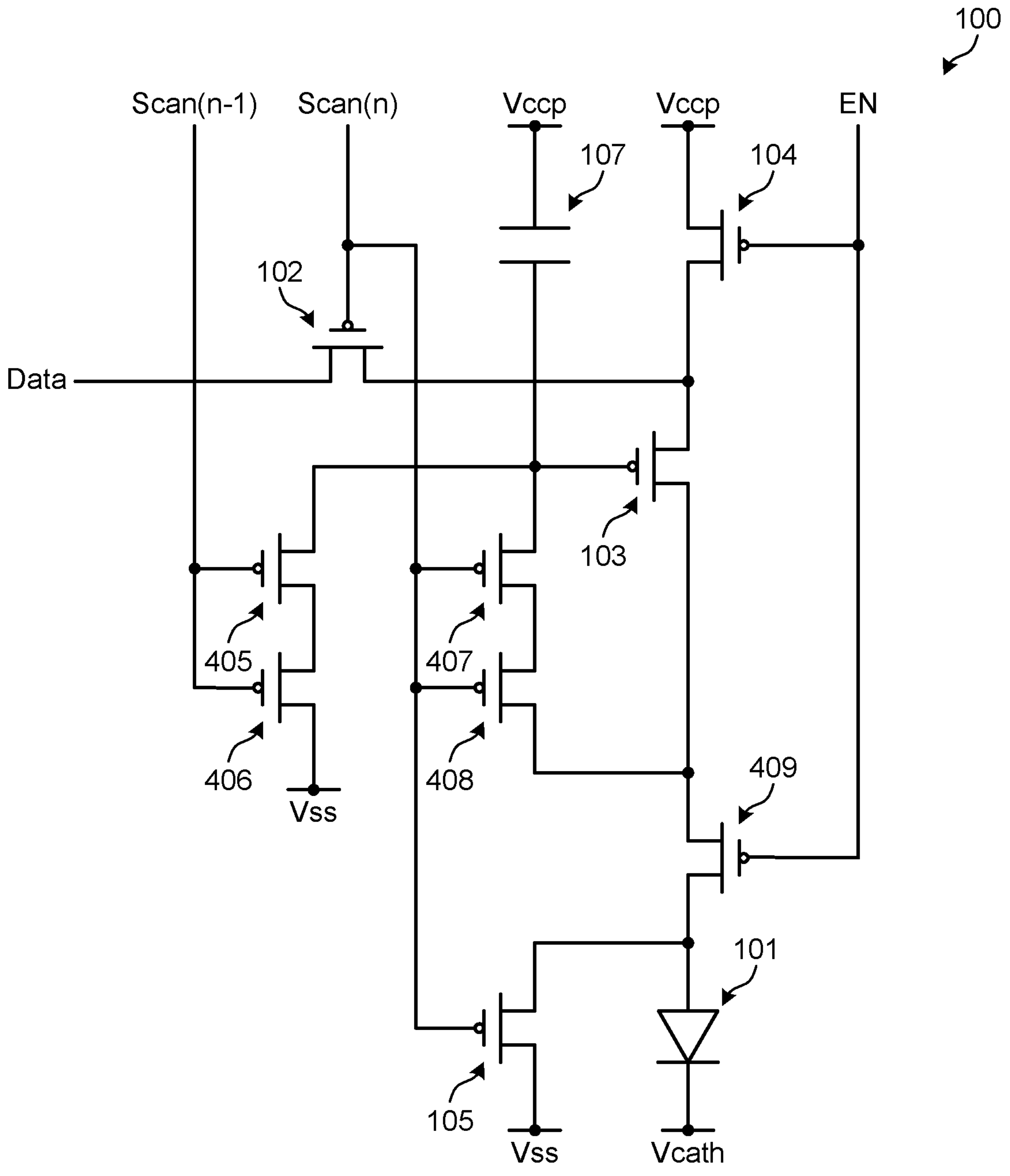
FIG. 19 is a diagram illustrating a configuration example of a pixel according to a modification of the embodiment of the present disclosure.

The pixel 100 in FIG. 19 illustrates an example in the case in which a voltage is applied to the holding capacitor 107 by MOS transistors 407 and 408 disposed between the gate and the drain of the driving transistor 103, a light emission control transistor 409, and the switching transistor 105.

As explained above, various pixels 100 (pixel circuits) can be applied to the display device 1.

6. Configuration Example of the Horizontal Drive Unit

A configuration of the horizontal drive unit 31 applicable to the display device 1 in the first embodiment is explained.

[Configuration of the Horizontal Drive Unit]

Figure 20:
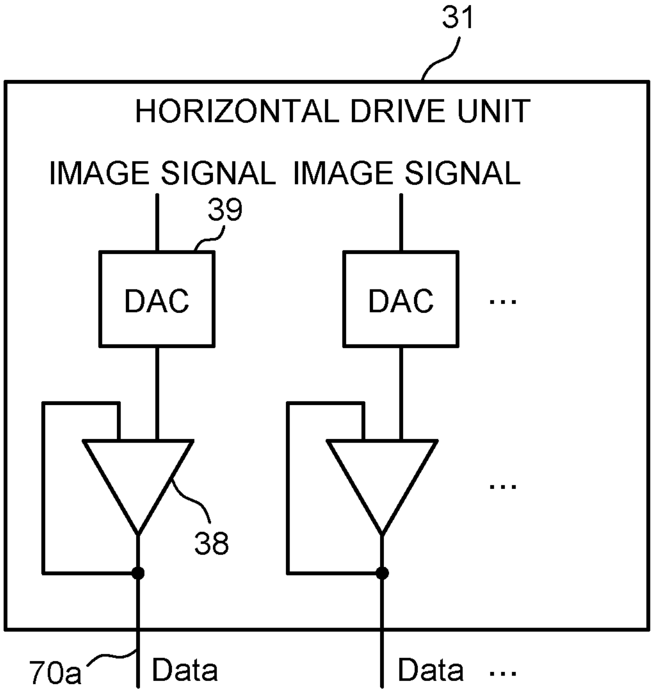
FIG. 20 is a diagram illustrating a configuration example of a horizontal drive unit according to a display device of the embodiment of the present disclosure.

FIG. 20 is a diagram illustrating a configuration example of a horizontal drive unit according to the display device in the embodiment of the present disclosure. The figure is a block diagram illustrating a configuration example of the horizontal drive unit 31 explained with reference to FIG. 4. The horizontal drive unit 31 generates an image signal based on image data input from a host device and outputs the image signal to the pixel array unit 10. As explained with reference to FIG. 5B, the horizontal drive unit 31 sequentially outputs image signals for one row. The image data input from the host device is configured by a digital image signal. The horizontal drive unit 31 converts the digital image signal into an analog image signal and outputs the analog image signal. The horizontal drive unit 31 in the figure includes a DAC 39 and an amplifier circuit 38 for each of columns.

The DAC 39 performs digital-to-analog conversion. The DAC 39 in the figure converts a digital image signal into an analog image signal and outputs the analog image signal to the amplifier circuit 38.

The amplifier circuit 38 is a circuit that amplifies the analog image signal output from the DAC 39. The amplifier circuit 38 in the figure is configured in a voltage follower circuit and performs current amplification of the analog image signal. The amplifier circuit 38 outputs the amplified analog image signal to the data line 70*a*. Note that the horizontal drive unit 32 can also adopt the same configuration as the horizontal drive unit 31.

[Another Configuration of the Horizontal Drive Unit]

Figure 21:
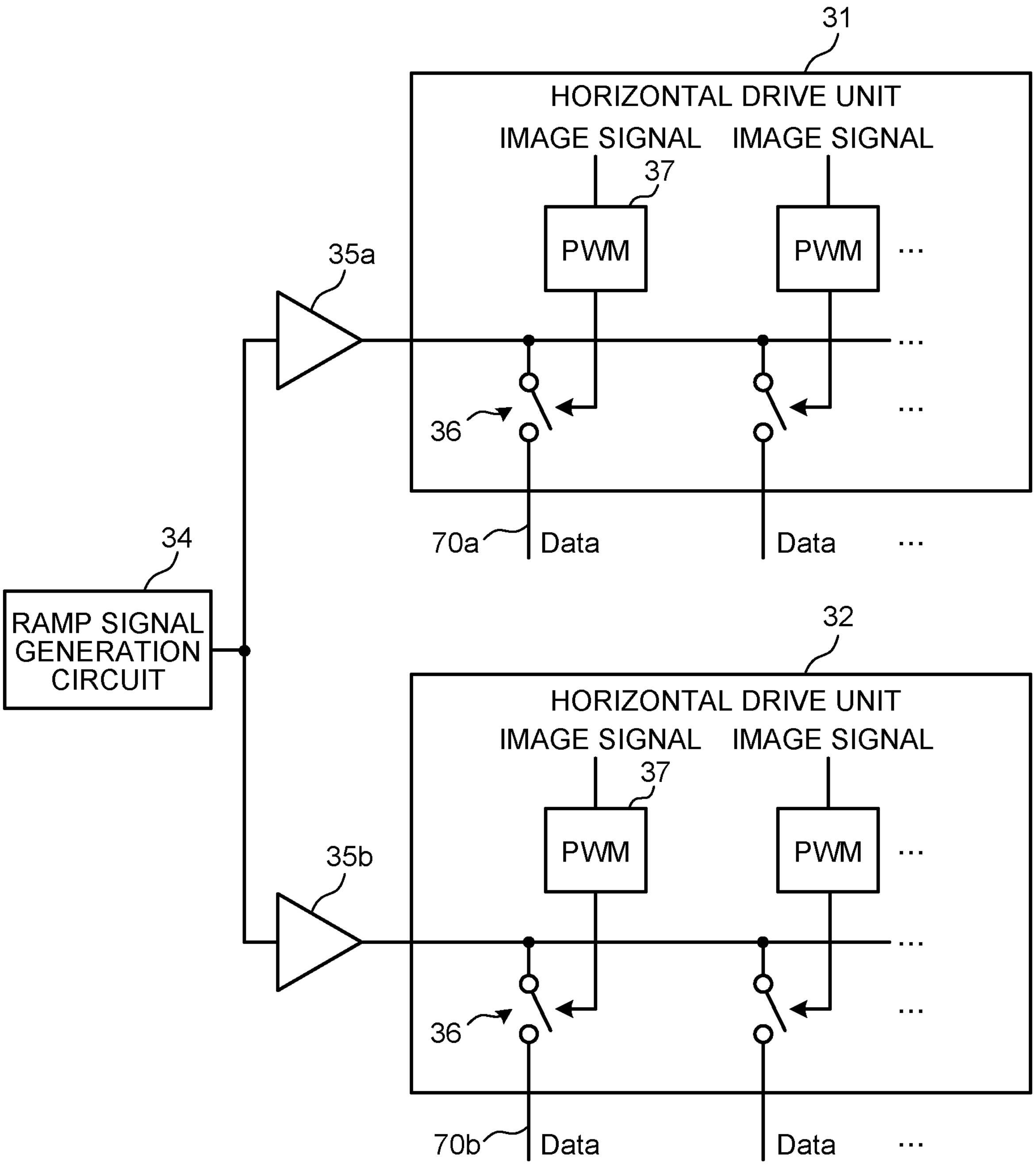
FIG. 21 is a diagram illustrating another configuration example of the horizontal drive unit according to the display device of the embodiment of the present disclosure.

FIG. 21 is a diagram illustrating another configuration example of the horizontal drive unit according to the display device of the embodiment of the present disclosure. The figure is a diagram illustrating a configuration example of the horizontal drive units 31 and 32. A ramp signal generation circuit 34 and amplifier circuits 35*a* and 35*b* are further illustrated in the figure.

The ramp signal generation circuit 34 is a circuit that generates a ramp signal. The ramp signal generation circuit 34 outputs the generated ramp signal to the amplifier circuit 35*a* and the amplifier circuit 38*b*.

The amplifier circuits 35*a* and 35*b* are equivalent to a buffer amplifier and output the input ramp signal respectively to the horizontal drive units 31 and 32.

The horizontal drive units 31 and 32 respectively include PWMs 37 and switch elements 36 for each of columns.

The PWM 37 generates a PWM (Pulse width modulation) signal from a digital image signal. The PWM signal is a pulse signal of a constant period and is a signal having a pulse width corresponding to a digital image signal. The PWM signal is a pulse signal having a duty corresponding to the digital image signal.

The switch element 36 opens and closes the output signal line of the amplifier circuit 35*a* and the data line 70 (the data line 70*a*) based on the PWM signal output from the PWM 37. The switch element 36 outputs the ramp signal input from the amplifier circuit 35*a* to the data line 70*a* in a period in which a pulse of the PWM signal is applied. For the switch element 36, for example, a MOS transistor can be used.

As illustrated in FIG. 4, the horizontal drive units 31 and 32 illustrated in the figure can be applied to the horizontal drive units 31 and 32 separately arranged above and below the pixel array unit 10.

Figure 22:
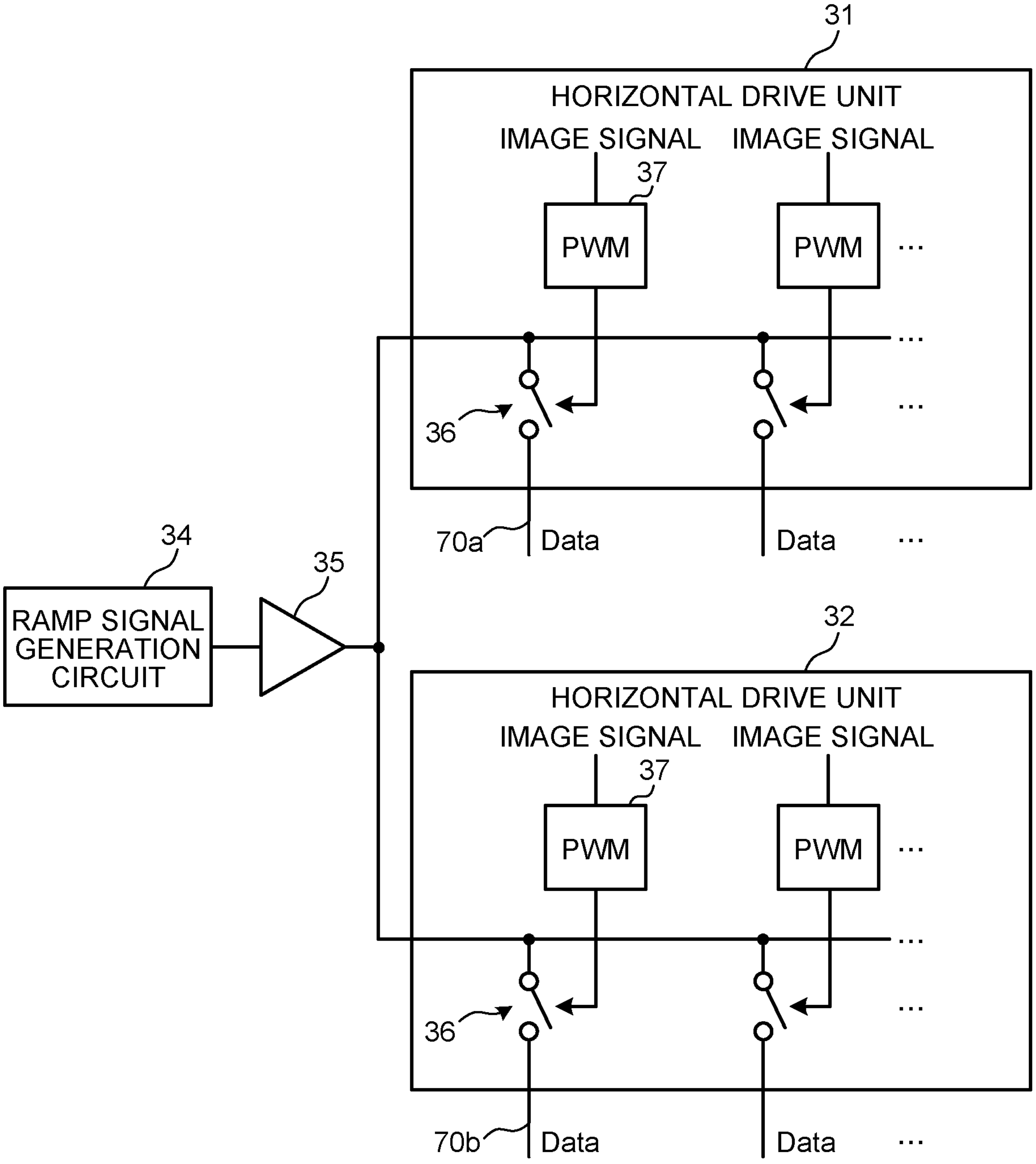
FIG. 22 is a diagram illustrating another configuration example of the horizontal drive unit according to the display device of the embodiment of the present disclosure.

FIG. 22 is a diagram illustrating another configuration example of the horizontal drive unit according to the display device of the embodiment of the present disclosure. Like FIG. 21, the figure is a diagram illustrating a configuration example of the horizontal drive units 31 and 32. A circuit in the figure is different from the circuit in FIG. 21 in including one amplifier circuit 35. The amplifier circuit 35 in the figure supplies an amplified ramp signal to the horizontal drive units 31 and 32.

As illustrated in FIG. 13, the horizontal drive units 31 and 32 illustrated in the figure can be applied to the horizontal drive units 31 and 32 disposed on one side of the pixel array unit 10.

[Operation of the Horizontal Drive Units]

Figure 23:
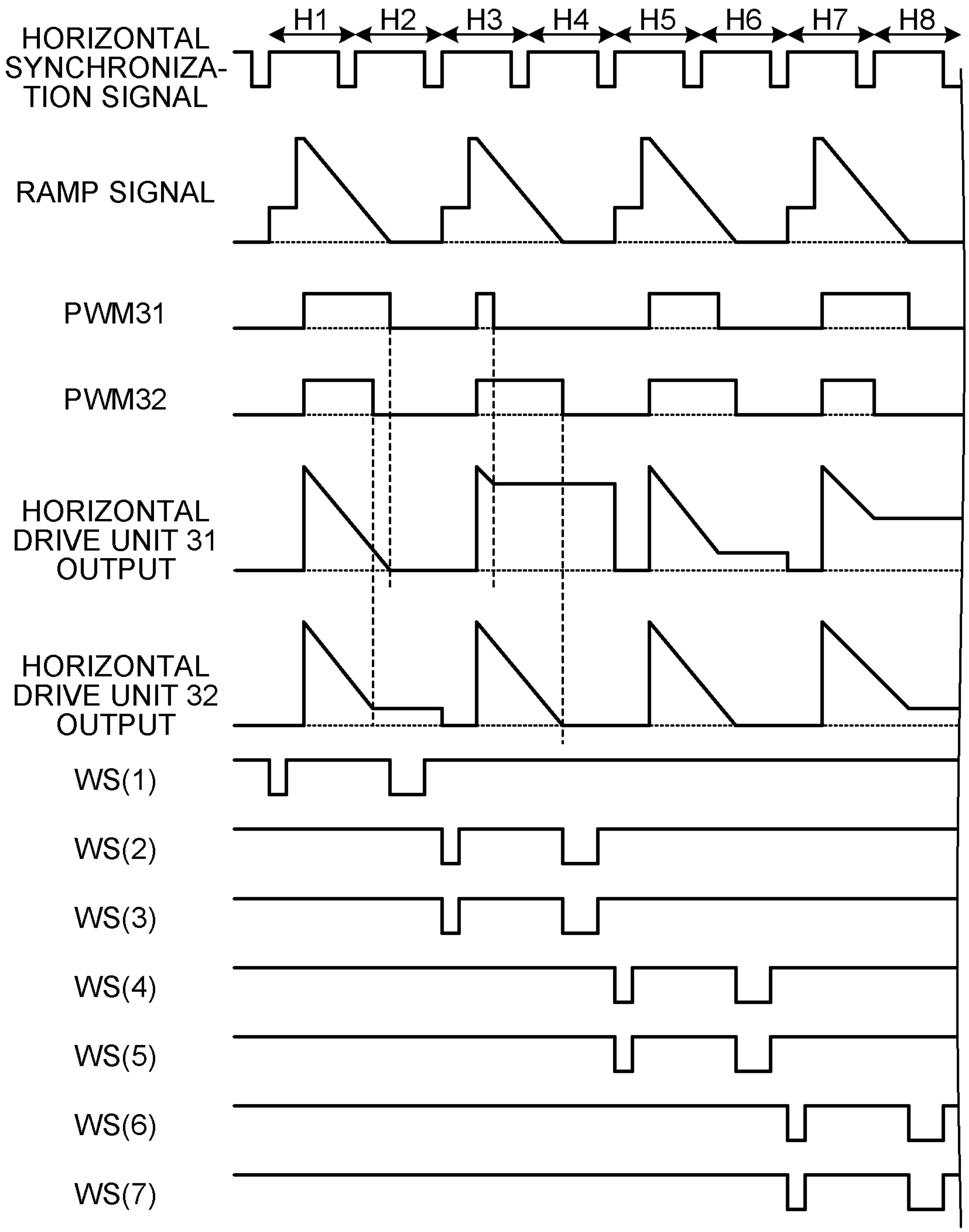
FIG. 23 is a diagram illustrating an operation example of the horizontal drive unit according to the display device of the embodiment of the present disclosure.

FIG. 23 is a diagram illustrating an operation example of the horizontal drive unit according to the display device of the embodiment of the present disclosure. The figure is a timing chart illustrating an operation example of the horizontal drive units 31 and 32 in FIG. 21 and FIG. 22. A "ramp signal" in the figure represents a waveform of a ramp signal output from the ramp signal generation circuit 34. A "PWM 31" and A "PWM 32" respectively represent a PWM signal of the horizontal drive unit 31 and a PWM signal of the horizontal drive unit 32. Otherwise, descriptions common to FIG. 5B are used.

The ramp signal generation circuit 34 repeatedly outputs a ramp signal, a voltage of which decreases in a ramp shape, in a cycle of two horizontal synchronization signals. The PWM 37 of each of the horizontal drive unit 31 and the horizontal drive unit 32 outputs a PWM signal in synchronization with the ramp signal. As represented by the waveforms of the "PWM 31" and the "PWM 32", these PWM signals are signals having pulse widths (periods of a value "1" in the figure) corresponding to analog image signals of the PWM signals. In the periods of the value "1" of the PWM signals, the switch element 36 conducts and a ramp signal is output to the data line 70. The ramp signal output to the data line 70 is an image signal input to the pixel 100. As the pulse width of the PWM signal is wider, a ramp signal having a lower voltage is output as an image signal.

As illustrated in the figure, the PWM 37 of each of the horizontal drive unit 31 and the horizontal drive unit 32 individually outputs a PWM signal to control the switch element 36 and outputs an image signal of each of the horizontal drive unit 31 and the horizontal drive unit 32. Consequently, a common ramp signal can be used in the horizontal drive unit 31 and the horizontal drive unit 32. The ramp signal generation circuit 34 can be shared by the horizontal drive unit 31 and the horizontal drive unit 32.

Note that the plurality of data lines 70 in FIGS. 20 to 22 and the like are desirably arranged in the same wiring layer and are desirably arranged in translational symmetry or point symmetry. This is to reduce variations in parasitic capacitance and parasitic resistance and prevent deterioration in image quality.

Note that the horizontal drive unit 30 and the vertical drive unit 20 illustrated in FIG. 1 can be configured by dedicated hardware. The horizontal drive unit 30 and the vertical drive unit 20 can also be configured by a microcomputer or the like equipped with firmware. In this case, the functions of the horizontal drive unit 30 and the vertical drive unit 20 are executed by the firmware.

Note that the effects described in this specification are only illustrations and are not limited. Other effects may be present.

Note that the present technique can also take the following configurations.

(1)

A display device comprising:

a pixel array unit configured by a plurality of pixels including light emitting elements and pixel circuits that cause the light emitting elements to emit light and arranged in a two-dimensional matrix;

a plurality of data lines that are arranged for each of columns in the pixel array unit and transmit image signals of the pixels;

a first pixel group configured by pixels arranged in a plurality of adjacent rows; and a second pixel group configured by pixels arranged in the plurality of adjacent rows and arranged adjacent to the first pixel group; wherein in the pixels of the first pixel group, the image signals are transmitted in common for each of the columns via the data line, and in the pixels of the second pixel group, the image signals are transmitted in common for each of the columns via the data line different from the data line that transmits the image signals to the first pixel group.

(2)

The display device according to the above (1), wherein in the pixel array unit, a plurality of the first pixel groups and a plurality of the second pixel groups are alternately arranged, the image signals are transmitted to the pixels of the plurality of first pixel groups via the common data line, and the image signals are transmitted to the pixels of the plurality of second pixel groups via the common data line.

(3)

The display device according to the above (1) or (2), wherein the plurality of data lines include a first pixel group data line that transmits the image signals to the pixels of the first pixel group and a second pixel group data line that transmits the image signals to the pixels of the second pixel group.

(4)

The display device according to the above (3), further comprising a pixel input signal line selection unit that is disposed for each of the pixels, selects one of the first pixel group data line and the second pixel group data line, and transmits the image signals.

(5)

The display device according to any one of the above (1) to (4), further comprising a second data line selection unit that selects one of the second data line connected to the pixels of the first pixel group and the second data line connected to the pixels of the second pixel group among a plurality of second data lines that are the data lines arranged for each of the columns and arranged for each of the rows in the first pixel group and the second pixel group and transmits the image signals.

(6)

The display device according to the above (5), wherein in the pixel array unit, a plurality of the first pixel groups and a plurality of the second pixel groups are alternately arranged, and the plurality of second data lines are configured by a plurality of second data lines connected in common to the pixels in corresponding rows in the plurality of first pixel groups and a plurality of second data lines connected in common to the pixels in corresponding rows in the plurality of second pixel groups.

(7)

The display device according to any one of the above (1) to (6), further comprising an image signal generation unit that generates the image signals and outputs the image signals to the plurality of data lines.

(8)

The display device according to the above (7), wherein the image signal generation unit includes a first image signal generation unit that generates and outputs the image signals of the pixels of the first pixel group and a second image signal generation unit that generates and outputs the image signals of the pixels of the second pixel group.

REFERENCE SIGNS LIST

1 DISPLAY DEVICE
10 PIXEL ARRAY UNIT
30 to 32 HORIZONTAL DRIVE UNIT
70, 70*a*, 70*b* DATA LINE
71 to 74 SECOND DATA LINE
100 PIXEL
101 LIGHT EMITTING ELEMENT
121 FIRST PIXEL GROUP
122 SECOND PIXEL GROUP
200, 210 SECOND DATA LINE SELECTION UNIT
201 to 204, 211 to 214 SWITCH ELEMENT

The invention claimed is:

1. A display device comprising:

a pixel array unit configured by a plurality of pixels including light emitting elements and pixel circuits that cause the light emitting elements to emit light and arranged in a two-dimensional matrix;

a plurality of data lines that are arranged for each of columns in the pixel array unit and transmit image signals of the pixels;

a first pixel group configured by pixels arranged in a plurality of adjacent rows; and a second pixel group configured by pixels arranged in the plurality of adjacent rows and arranged adjacent to the first pixel group; wherein in the pixels of the first pixel group, the image signals are transmitted in common for each of the columns via the data line, and in the pixels of the second pixel group, the image signals are transmitted in common for each of the columns via the data line different from the data line that transmits the image signals to the first pixel group.

2. The display device according to claim 1, wherein in the pixel array unit, a plurality of the first pixel groups and a plurality of the second pixel groups are alternately arranged, the image signals are transmitted to the pixels of the plurality of first pixel groups via the common data line, and the image signals are transmitted to the pixels of the plurality of second pixel groups via the common data line.

3. The display device according to claim 1, wherein the plurality of data lines include a first pixel group data line that transmits the image signals to the pixels of the first pixel group and a second pixel group data line that transmits the image signals to the pixels of the second pixel group.

4. The display device according to claim 3, further comprising a pixel input signal line selection unit that is disposed for each of the pixels, selects one of the first pixel group data line and the second pixel group data line, and transmits the image signals.

5. The display device according to claim 1, further comprising a second data line selection unit that selects one of the second data line connected to the pixels of the first pixel group and the second data line connected to the pixels of the second pixel group among a plurality of second data lines that are the data lines arranged for each of the columns and arranged for each of the rows in the first pixel group and the second pixel group and transmits the image signals.

6. The display device according to claim 5, wherein in the pixel array unit, a plurality of the first pixel groups and a plurality of the second pixel groups are alternately arranged, and the plurality of second data lines are configured by a plurality of second data lines connected in common to the pixels in corresponding rows in the plurality of first pixel groups and a plurality of second data lines connected in common to the pixels in corresponding rows in the plurality of second pixel groups.

7. The display device according to claim 1, further comprising an image signal generation unit that generates the image signals and outputs the image signals to the plurality of data lines.

8. The display device according to claim 7, wherein the image signal generation unit includes a first image signal generation unit that generates and outputs the image signals of the pixels of the first pixel group and a second image signal generation unit that generates and outputs the image signals of the pixels of the second pixel group.

* * * * *